United States Patent [19]

Aoki et al.

[11] Patent Number: 5,018,068
[45] Date of Patent: May 21, 1991

[54] METHOD OF DETERMINING ENGINE RACING AND METHOD OF PREVENTING ENGINE RACING DURING SHIFT IN VEHICULAR AUTOMATIC TRANSMISSION

[75] Inventors: Takashi Aoki, Saitama; Satoshi Terayama, Tokyo; Yoshihisa Iwaki; Takamichi Shimada, both of Saitama, all of Japan

[73] Assignee: Honda Giken Kogyo Kabushiki Kaisha, Tokyo, Japan

[21] Appl. No.: 318,130

[22] Filed: Mar. 2, 1989

[30] Foreign Application Priority Data

Mar. 3, 1988 [JP] Japan .................................. 63-50336
Mar. 30, 1988 [JP] Japan .................................. 63-77487
Apr. 4, 1988 [JP] Japan .................................. 63-103499

[51] Int. Cl.⁵ ...................... G05D 17/02; B60K 41/08
[52] U.S. Cl. ..................................... 364/424.1; 74/866
[58] Field of Search ............... 364/424.1; 74/866, 867, 74/868, 869; 192/3.58

[56] References Cited

U.S. PATENT DOCUMENTS

| 3,927,579 | 12/1975 | Golan | 74/868 X |
| 4,073,204 | 2/1978 | Dick | 74/866 |
| 4,309,919 | 1/1982 | Iwanaga et al. | 74/869 |
| 4,431,095 | 2/1984 | Suga | 192/3.58 |
| 4,457,410 | 7/1984 | Suga et al. | 74/866 |
| 4,582,182 | 4/1986 | Takeda et al. | 192/3.58 |

FOREIGN PATENT DOCUMENTS 61-189354 8/1986 Japan .................................. 364/424.1

Primary Examiner—Felix D. Gruber
Attorney, Agent, or Firm—Lyon & Lyon

[57] ABSTRACT

Engine racing is determined during shift in an automatic transmission having clutches associated with respective gear positions, by, after a shift command is issued to effect a shift in a power-on mode, detecting the input and output rotational speed ratios of previous-gear-position and next-gear-position clutches of the transmission, and determining that engine racing has occurred if the input and output rotational speed ratio of one of the clutches which is normally greater than 1.0 during a gear shift remains below a threshold value slightly smaller than 1.0 for a predetermined period of time.

19 Claims, 14 Drawing Sheets

METHOD OF DETERMINING ENGINE RACING AND METHOD OF PREVENTING ENGINE RACING DURING SHIFT IN VEHICULAR AUTOMATIC TRANSMISSION

BACKGROUND OF THE INVENTION

The present invention relates to a vehicular automatic transmission for changing power transmission paths by controlling operation of clutches for automatically shifting gears of the transmission.

Automatic transmissions are arranged to shift gears automatically dependent on running conditions of a motor vehicle to achieve desired vehicle running characteristics. It is customary to provide a gear shift map composed of upshifting and downshifting curves for each gear position, the curves being established in relation to the vehicle speed and the engine power output, and to control the automatic transmission to shift the gears according to the gear shift map dependent on the running conditions as indicated on the gear shift map. One example of such a gear shifting control is disclosed in Japanese Laid-Open Patent Publication No. 61-189354.

For controlling the automatic transmission in the above manner, it has been required to shift the gears smoothly to minimize any shock or delay during operation of the transmission. There have heretofore been proposed various measures to meet such a requirement.

When the accelerator pedal is depressed and the transmission is shifted down (a "power-on/downshift" mode corresponding to a kickdown) or when the accelerator pedal is depressed to increase the vehicle speed and the transmission is shifted up (a "power-on/upshift" mode), since the rotational speed of the engine is increased in response to the depression of the accelerator pedal, the engine may race unless the operation of the transmission is controlled adequately, because of the wrong timing of a gear shift, a reduction in the hydraulic pressure for controlling transmission, and other undesirable conditions. When engine racing occurs, a shock may be developed by the transmission upon a gear shift, and the driver may have a bad feeling during the shifting of transmission gears.

If the occurrence of engine racing and the magnitude thereof can be detected precisely, then such engine racing, when it has occurred, can be suppressed by controlling the hydraulic pressure supplied to the clutches in the transmission or controlling the power output of the engine. However, it has been difficult to accurately detect engine racing. Conventionally, the occurence of engine racing has been detected based on a change in the rotational speed of the engine. With such a conventional detecting process, no accurate detection of engine racing is possible since the rotational speed of the engine is affected by a slippage of a torque converter which is coupled to the output shaft of the engine.

SUMMARY OF THE INVENTION

It is an object of the present invention to provide a method of accurately determining engine racing when a gear shift is effected in a vehicular automatic transmission while the accelerator pedal is being depressed.

Another object of the present invention is to provide a method of preventing engine racing by accurately detecting the occurrence and magnitude of engine racing when a downshift is effected in a vehicular automatic transmission while the accelerator pedal is being depressed, and suppressing engine racing in subsequent shifts in the transmission.

Still another object of the present invention is to provide a method of preventing engine racing by accurately detecting the occurrence and magnitude of engine racing when an upshift is effected in a vehicular automatic transmission while the accelerator pedal is being depressed, and suppressing engine racing in subsequent shifts in the transmission.

To achieve the above objects, when an upshift is effected in a power-on mode, it is determined, after a shift command for the upshift is issued, that engine racing has occurred if the input and output rotational ratio of a previous-gear-position clutch of a transmission, which ratio is normally larger than 1.0 during gear shifts, remains lower than a threshold that is slightly smaller than 1.0 in view of an error, for a predetermined period of time. When a downshift is effected in the power-on mode, it is determined, after a gear shift command for the downshift is issued, that engine racing has occurred if the input and output rotational ratio of a next-gear-position clutch of the transmission, which ratio is normally larger than 1.0 during gear shifts, remains lower than a threshold that is slightly smaller than 1.0 in view of an error, for a predetermined period of time.

According to an engine racing determining method of the invention, in a power-on/upshift mode, when a gear shift is smoothly made without engine racing after a gear shift command for an upshift is issued, the input and output rotational speed ratio of the previous-gear-position clutch is not reduced lower than 1.0. Therefore, engine racing can easily and accurately be detected by determining whether the input and output rotational speed ratio of the previous-gear-position clutch remains below the threshold slightly smaller than 1.0 for the predetermined period of time.

In a power-on/downshift mode, when a gear shift is smoothly made without engine racing after a shift command for a downshift is issued, the input and output rotational speed ratio of the next-gear-position clutch is not reduced lower than 1.0. Therefore, engine racing can easily and accurately be detected by determining whether the input and output rotational speed ratio of the next-gear-position clutch is not reduced lower than 1.0. Therefore, engine racing can easily and accurately be detected by determining whether the input and output rotational speed ratio of the next-gear-position clutch remains below the threshold slightly smaller than 1.0 for the predetermined period of time.

According to an engine racing preventing method of the invention, when engine racing is determined in a downshift in the power-on mode, the magnitude of the engine racing is detected, an amount of correction is determined based on the detected magnitude of the engine racing, and engine racing in subsequent gear shifts is prevented by correction using the determined amount of correction. The magnitude of the engine racing may be either a value calculated by integrating, with respect to time, a portion by which the input and output rotational speed ratio is below the threshold during the engine racing, or the difference between the minimum value of the input and output rotational speed ratio and the threshold, or the length of time during which the engine racing takes place (i.e., the length of time during which the input and output rotational speed ratio is lower than the threshold). Engine racing in subsequent gear shifts may be prevented by correcting the magnitude of a hydraulic pressure supplied to the next-gear-position clutch, the timing of increasing the hydraulic pressure, or the engine power output.

The same engine racing preventing process is employed when engine racing is determined in an upshift in the power-on mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein.

DESCRIPTION OF THE PREFERRED EMBODIMENTS

Figure 1:
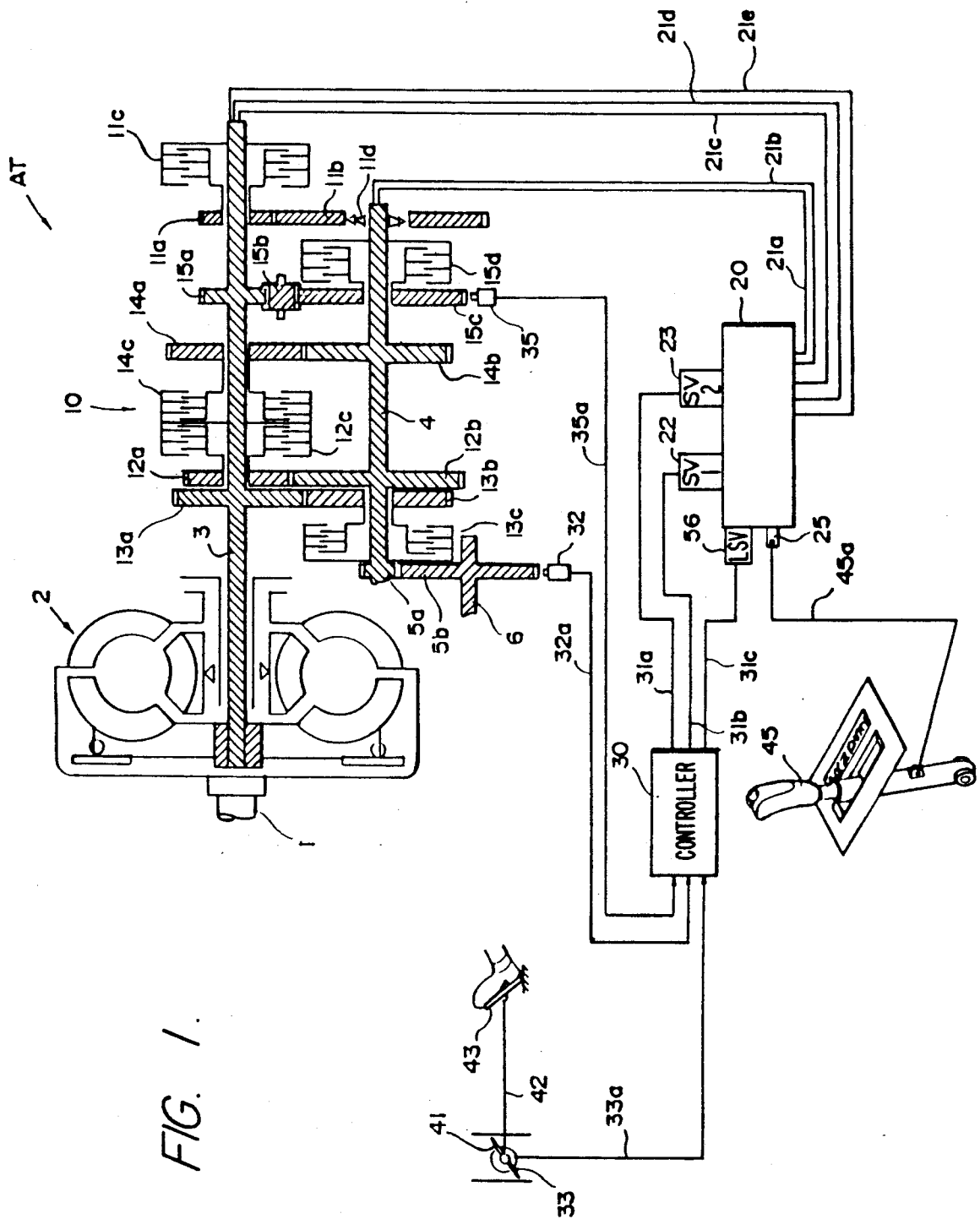
FIG. 1 is a schematic view of an automatic transmission controlled by an engine racing determining method according to the present invention.

FIG. 1 schematically shows an automatic transmission which is mounted on a motor vehicle and controlled by an engine racing determining method of the present invention. The automatic transmission, generally denoted at AT, has a transmission mechanism 10 comprising a plurality of gear trains for changing the speed of rotation of the engine power output transmitted from a torque converter 2 and for applying the engine power output to an output shaft 6. More specifically, the engine power output from the torque converter 2 is applied to an input shaft 3, and then transmitted, while its rotational speed is being changed, to a countershaft 4 extending parallel to the input shaft 3 through a selected one of five gear trains disposed parallel between the input shaft 3 and the countershaft 4. The engine power output is then applied from the countershaft 4 to the output shaft 6 through output gears 5a, 5b disposed between the countershaft 4 and the output shaft 6.

The five gear trains between the input shaft and the countershaft 4 include a gear train composed of gears 11a, 11b for a first gear position, a gear train composed of gears 12a, 12b for a second gear position, a gear train composed of gears 13a, 13b for a third gear position, a gear train composed of gears 14a, 14b for fourth gear position, and a gear train composed of gears 15a, 15b, 15c for a reverse gear position. These gear trains are associated respectively with hydraulically operated clutches 11c, 12c, 13c, 14c 15d for enabling the gear trains to transmit the engine power output from the input shaft 3 to the countershaft 4. A one-way clutch 1id is disposed in the gear 11b. By selectively operating the hydraulically operated clutches, one of the five gear trains is selected for engine power transmission while changing the rotational speed of the transmitted engine power output.

The five hydraulically operated clutches 11c through 15d are controlled in operation by a hydraulic pressure supplied and discharged through hydraulic pressure lines 21a through 21e from and to a hydraulic pressure control valve assembly 20.

The hydraulic pressure control valve assembly 20 is operated by a manual spool valve 25 coupled by a wire 45a to a shift lever 45 movable by the driver, two solenoid valves 22, 23, and a linear solenoid valve 56.

The solenoid valves 22, 23 are selectively actuated and inactivated by operating signals supplied from a controller 30 through signal line 31a, 31b. The linear solenoid valve 56 is operated by a signal supplied from the controller 30 via a signal line 31c. The controller 30 is supplied with a rotational speed signal fed via a signal line 35a from a first rotational speed sensor 35 which detects the rotational speed of an input member of the hydraulically operated clutch 15d based on rotation of the reverse gear 15c, a rotational speed sensor 32 which detects the rotational speed of an output member of the hydraulically operated clutch 13c based on rotation of the output gear 5b, and a throttle valve opening signal fed via a signal line 33a from a throttle valve opening sensor 33 which detects the opening of an engine throttle valve 41. The throttle valve 41 is coupled to a throttle or accelerator pedal 43 through a wire 42. Therefore, the depth to which the throttle pedal 43 is depressed can be detected by detecting the throttle valve opening.

Operation to control gear shifting in the automatic transmission of the above construction will be described below.

Shift control is performed dependent on a shift range selected by the manual valve 25 of the hydraulic pressure control valve assembly 20 in response to manual operation of the shift lever 45. The shift ranges include shift ranges or positions P, R, N, D, S, 2 for example. In the ranges P and N, all the clutches 11c through 15d are disengaged and the transmission is in a neutral position. In the range R, the reverse-gear-position clutch 15c is engaged to select the reverse gear position. In the ranges D, S, and 2, gear positions are selected based on a gear shift map.

Figure 6:
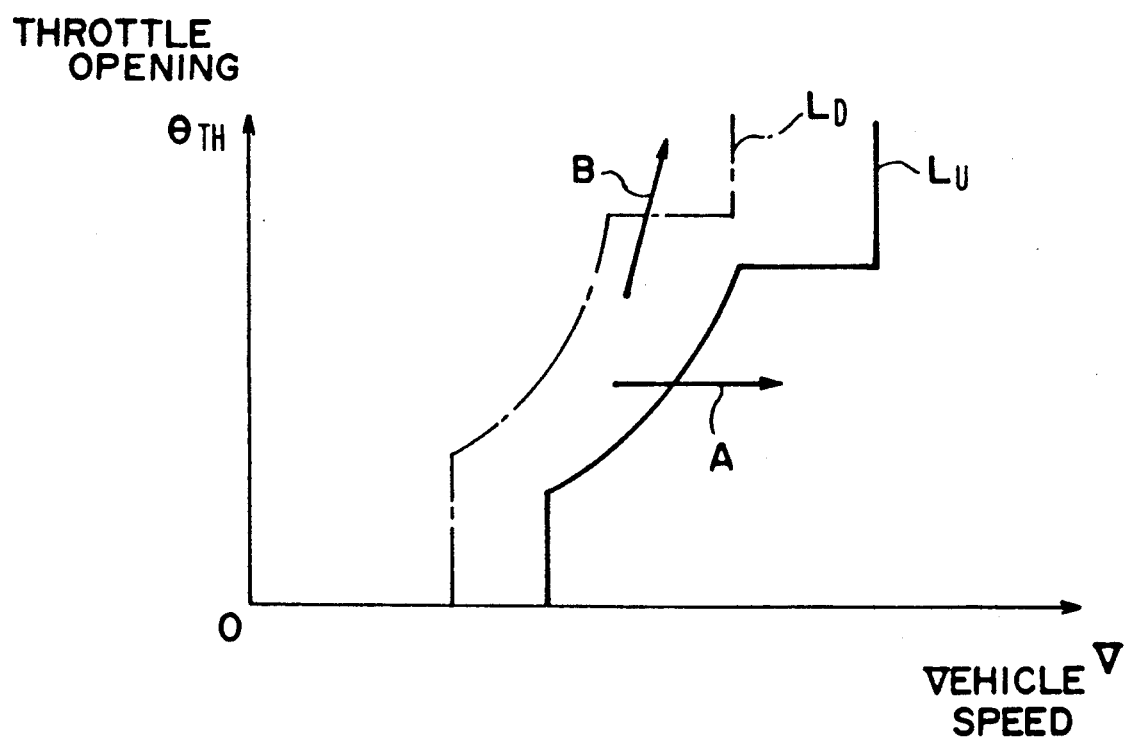
FIG. 6 is a graph illustrating a gear shift map used for effecting gear shifting in the automatic transmission.

As shown in FIG. 6, the shift map is composed of an upshifting line $L_U$ and a downshifting line $L_D$, these lines being plotted in a graph having a vertical axis indicating the throttle valve opening $\theta_{TH}$ and a horizontal axis indicating the vehicle speed V. When a point on the shift map which represents the running condition of the motor vehicle as determined by the engine throttle valve opening (the amount of depression of the accelerator pedal) and the vehicle speed moves to the right across the upshifting line $L_U$, the transmission effects an upshift. When the point moves to the left across the downshifting line $L_D$ after the upshift, the transmission effects a downshift. While the shift map of FIG. 6 is shown as having one upshifting line and one downshifting line, the gear shift map actually has a plurality of upshifting lines and a plurality of downshifting lines dependent on the number of gear positions available in the transmission.

The "power-on/downshift" mode refers to the condition in which the accelerator pedal is depressed while the vehicle is running and the point representing the running condition in the shift map moves from an upshift region (right-hand region) across the downshifting line $L_D$ into a downshift region (left-hand region) as indicated by the arrow B to effect a downshift. The "power-on/upshift" mode refers to the condition in which the accelerator pedal is depressed to a certain depth to increase the vehicle speed while the vehicle is running, and the point representing the running condition in the shift map moves from the downshift region across the upshifting line $L_U$ into the upshift region as indicated by the arrow A to effect an upshift.

When the running condition point in the shift map goes across the upshifting or downshifting line, the controller 30 applies operating signals over the signal lines 31a, 31b to the solenoid valves 22, 23 to operate the hydraulic pressure control valve assembly 20 to supply hydraulic pressure to and discharge hydraulic pressure from the hydraulically operated clutches 11c through 11d for effecting an upshift or a downshift.

The hydraulic pressure control valve assembly 20 will be described below with reference to FIG. 2.

The control valve 20 delivers operating oil supplied from an oil sump 7 by a pump 8 to a regulator valve 50 via a line 101, and the pressure of the delivered operating oil is regulated into a predetermined line pressure by the regulator valve 50. The line pressure is applied via a line 110 to the manual spool valve 25 which then selectively supplies the line pressure to the gear position clutches 11c, 12c, 13c, 14c, 15d to control these clutches, dependent on operation of the manual spool valve 25 and various other valves in the control valve assembly 20 according to running conditions of the motor vehicle.

The various valves in the control valve assembly 20 will be described below. The control valve assembly 20 includes a relief valve 52 disposed downstream of the regulator valve 50 for preventing lubricating oil supplied to various parts of the automatic transmission AT via a line 102 from rising beyond a predetermined pressure level. A modulator valve 54 reduces the line pressure fed from a line 103 to produce a prescribed modulator pressure. The modulator valve 54 then supplies working oil under the modulator pressure via a line 104 to a lockup clutch control circuit (not shown) of the torque converter 2 and also via a line 105 to the first and second solenoid valve 22, 23 for controlling operation of shift valves.

The manual spool valve 25 is operated in interlinked relation to the shift lever 45 that is manually moved by the driver. The manual valve 25 is selectively positioned in any one of six positions P, R, N, D, S, 2 for selectively supplying the line pressure from the line 110 to lines 25a through 25g.

When the manual valve 25 is in any one of the positions D, S, 2, a 1-2 shift valve 60, a 2-3 shift valve 62, and a 3-4 shift valve 64 are controlled by the modulator pressure supplied via lines 106a through 106f dependent on whether the first and second solenoid valves 22, 23 are turned on or off, for controlling the supply of the line pressure to and the discharge of the line pressure from the clutches 11c, 12c, 13c, 14c for the first through fourth gear positions, respectively.

The lines 106a, 106b are connected to the first solenoid valve 22 and also to the line 105 through an orifice 22a. When the solenoid of the first solenoid valve 22 is de-energized, its port leading to a drain is closed, and working oil under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second solenoid valve 23 is turned off, the drain port thereof is closed to allow the working oil under the modulator pressure to be supplied from the line 105 to the lines 106c through 106f. When the solenoid of the second solenoid valve 23 is turned on, the drain port thereof is opened to reduce the pressure in the lines 106c through 106f substantially to zero.

The line 106a is connected to the right-hand end (as shown) of the 1-2 shift valve 60, the line 106b is connected to the right-hand end of the 2-3 shift valve 62, the line 106c is connected to the left-hand end of the 1-2 shift valve 60, the line 106e is connected to the right-hand end of the 3-4 shift valve 64, and the line 106f is connected to the left-hand end of the 2-3 shift valve 62. The lines 106e, 106f are coupled to the second solenoid valve 23 through the manual valve 25 and the line 106d. Therefore, by controlling the operation of the first and second solenoid vales 22, 23 to control the supply of the modulator pressure from the line 105 to the lines 106a through 106f, the operation of the 1-2, 2-3, and 3-4 shift valves 60, 62, 64 can be controlled to selectively supply the line pressure fed from the line 110 via the manual valve 25 to the hydraulically operated clutches 11c, 12c, 13c, 14c for selecting a desired gear position.

The control valve assembly 20 also has first, second, third, and fourth orifice control valves 70, 72, 74, 76 for releasing hydraulic pressure from the hydraulic pressure chamber in the clutch associated with a previous gear position in timed relation to the development of a pressure build-up in the hydraulic pressure chamber in the clutch associated with a next gear position, when a gear shift is effected. More specifically, the first orifice control valve 70 controls the timing of releasing the hydraulic pressure from the third-gear-position clutch when a downshift is effected from the third gear position to the second gear position. The second orifice control valve 72 controls the timing of releasing the hydraulic pressure from the second-gear-position clutch when an upshift is carried out from the second gear position to the third gear position or from the second gear position to the fourth gear position. The third orifice control valve 74 controls the timing of releasing the hydraulic pressure from the fourth-gear-position clutch upon a downshift from the fourth gear position to the third gear position or from the fourth gear position to the second gear position. The fourth orifice control valve 76 controls the timing of releasing the hydraulic pressure from the third-gear-position clutch at the time of an upshift from the third gear position to the fourth gear position.

The control valve assembly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also have back pressure chambers opposite to the respective pressure bearing chambers with pistons 81a, 82a, 83a, 84a therebetween, the back pressure chamber being connected to respective lines 121, 122, 123, 124 which are coupled to the linear solenoid valve 56 via lines 120a, 120b and a line 120.

The linear solenoid valve 56 has a linear solenoid 56a. A current supplied to the linear solenoid 56a is controlled to control the operating force of the linear solenoid valve 56 for controlling the magnitude of a hydraulic pressure to be supplied to a line 120. By controlling the current supplied to the linear solenoid 56a, therefore, the hydraulic pressure in the back pressure chambers of the accumulators 81 through 84 can be controlled to control the hydraulic pressure in the hydraulic pressure chamber in an engaged clutch (next-gear-position clutch) when a gear shift is effected.

In the hydraulic pressure control valve assembly 20 thus constructed, the manual valve 25 is operated by the shift lever 45 and the solenoid valves 22, 23 are turned on and off to selectively supply the line pressure to the hydraulically operated clutches 11c, 12c, 13c, 14c for automatically selecting a gear position.

Figure 3:
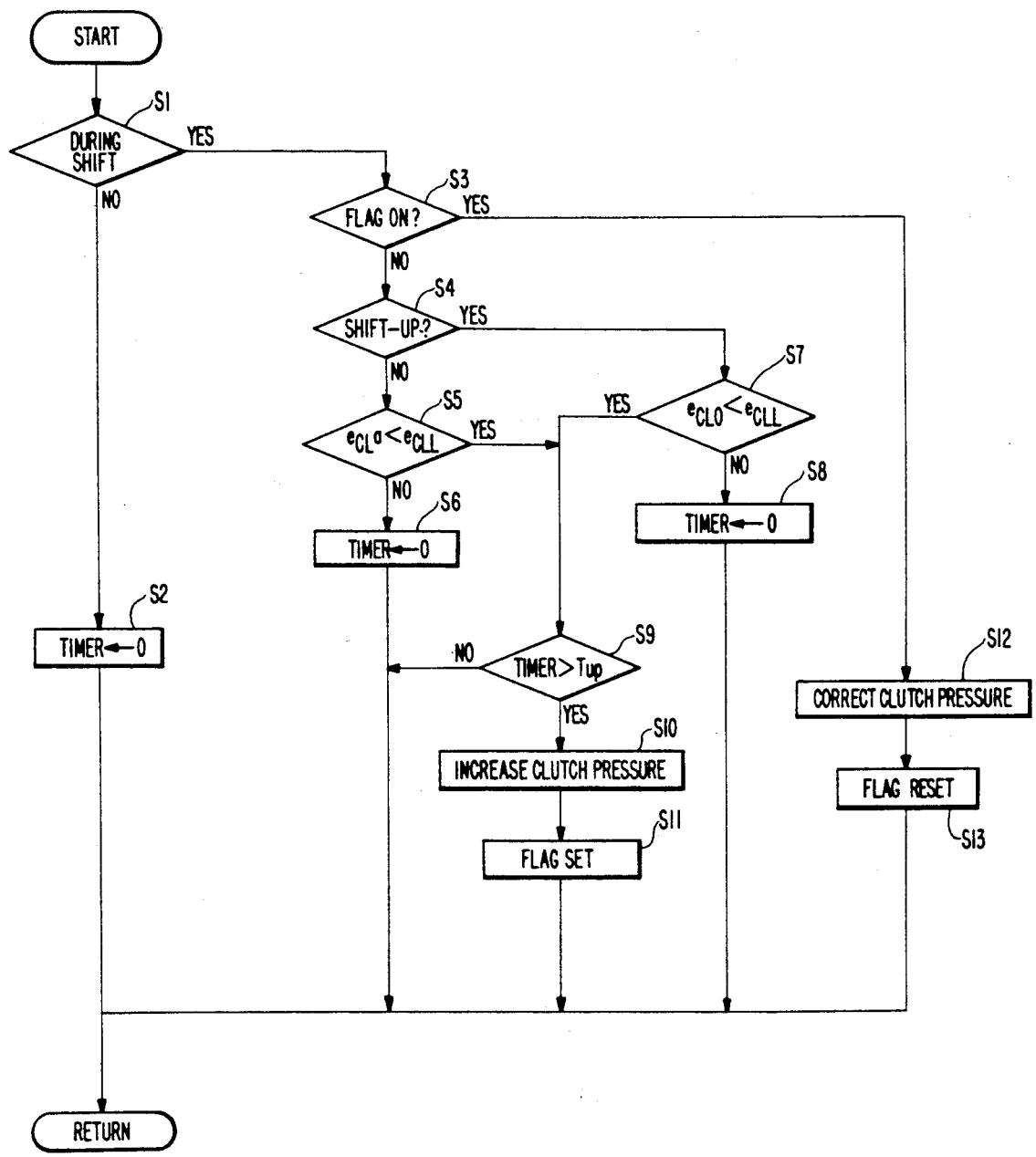
FIG. 3 is a flowchart showing the engine racing determining method of the invention.

A method of determining engine racing when a gear shift is effected in the power-on mode of the automatic transmission of the above construction will be described below with reference to the flowchart of FIG. 3 and the graphs of FIGS. 4 and 5.

First, in a step S1 it is determined whether a gear shift is being effected. If not, it is not necessary to determine whether engine racing occurs or not, and hence a timer is set to zero in a step S2, followed by ending the operation sequence.

If a gear shift is being effected in the step S1, then a step S3 determines whether a racing determining flag is on or off. Since the racing determining flag is off at the time of starting the gear shift, control goes to a step S4 to check if the gear shift is an upshift or not. If the gear shift is an upshift, then control goes to a step S7 which determines whether the ratio $e_{CLO}$ of input and output rotational speeds (=(output speed)/(input speed)) of a previous-gear-position clutch is smaller than a threshold $e_{CLL}$ which is slightly smaller than 1.0 in view of an error, the ratio $e_{CLO}$ being normally larger than 1.0 during a gear shift. The input and output rotational speeds are obtained by detecting the speeds from the first and second rotational speed sensors 35, 32 and converting the speeds using the gear ratios from the gears 15c, 5b to those in the previous-gear-position clutch.

Figure 4B:
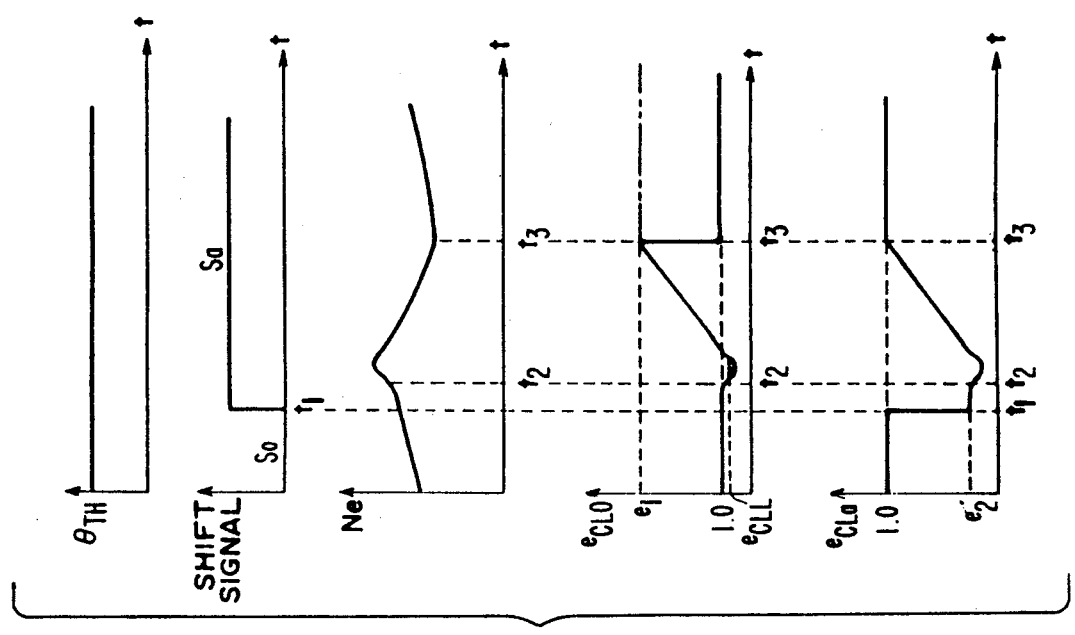
FIGS. 4a, 4b and 5a, 5b are graphs showing how throttle valve openings, shift signals, engine rotational speeds, and the ratios of input and output rotational speeds of clutches vary with respect to time.
Figure 4A:
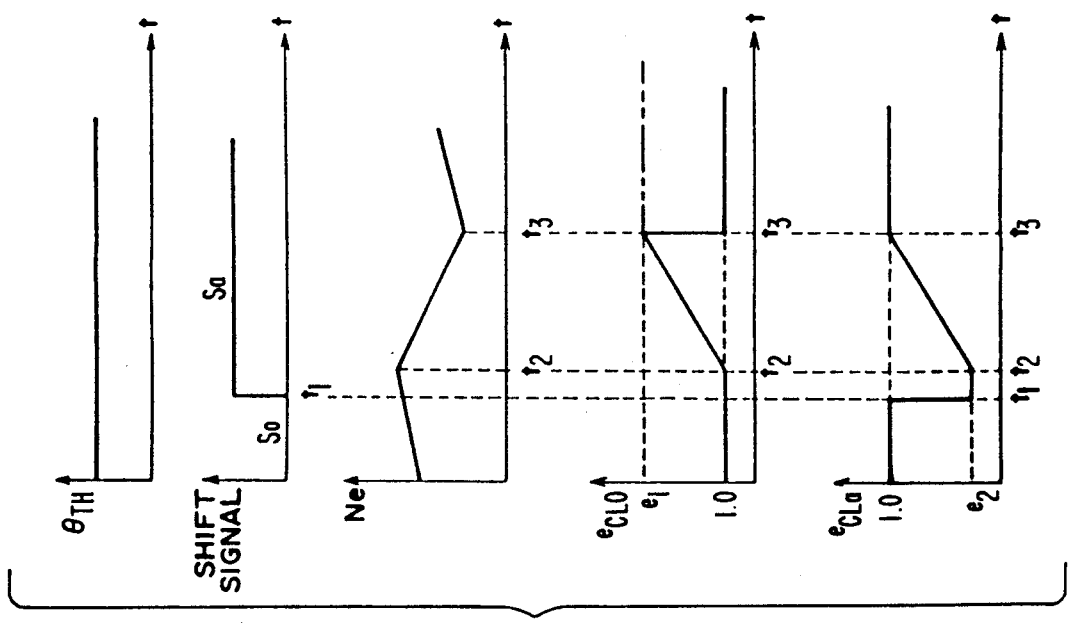

The decision step S7 will be described in more detail with reference to FIG. 4. FIG. 4 shows how throttle valve openings $\theta_{TH}$, shift signals, engine rotational speeds Ne, and the ratios $e_{CLO}$, $e_{CLa}$ of input and output rotational speeds of the previous-gear-position clutch and the next-gear-position clutch vary with respect to time. The graphs of FIG. 4 indicate the condition in which the throttle valve is opened to a certain degree (the accelerator pedal is depressed), and the running condition point moves across the upshifting line on the shift map at a time $t_1$ to issue a shift command by which a shift signal So is changed to a shift signal Sa. FIG. 4(A) shows the signals when there is no engine racing, and FIG. 4(B) shows the signals when engine racing occurs.

As illustrated in FIG. 4(A), the previous-gear-position clutch is disengaged after a predetermined time delay when a shift command is issued, and substantially simultaneously the next-gear-position clutch starts engaging at a time $t_2$. At the time $t_2$, the input and output rotational speed ratio $e_{CLO}$ of the previous-gear-position clutch is 1.0. Thereafter, the input and output rotational speed ratio $e_{CLO}$ of the previous-gear-position clutch is progressively increased as the next-gear-position clutch is progressively engaged. Normally, therefore, the input and output rotational speed ratio $e_{CLO}$ of the previous-gear-position clutch does not become smaller than 1.0. The input and output rotational speed ratio $e_{CLa}$ of the next-gear-position clutch is $e_2$ ($<1$) at the time $t_2$ and thereafter becomes progressively larger and approaches 1.0 as the next-gear-position clutch is progressively engaged. When the engagement of the next-gear-position clutch is completed at a time $t_2$, the input and output rotational speed ratio $e_{CLa}$ reaches 1.0. Since the gear ratio of the transmission is reduced due to the upshift and the load on the engine is increased, the engine rotational speed is lowered until the engagement of the next-gear-position clutch is completed, and then goes up progressively after the next-gear-position clutch is fully engaged.

Prior to the gear shift, i.e., before the shift command is issued (prior to the time $t_1$), the clutches are not distinguished as being a previous-gear-position clutch or a next-gear-position clutch, and both the ratios $e_{CLO}$, $e_{CLa}$ indicate the input and output rotational speed ratio of the clutch which is being engaged at the time and hence are 1.0. When the gear shift begins at the time $t_1$, the input and output rotational speed ratio $e_{CLa}$ of the next-gear-position clutch becomes equal to the input and output rotational speed ratio $e_2$ of the clutch to be engaged (next-gear-position clutch). After the time $t_3$, therefore, the speed ratio $e_{CLO}$ of the previous-gear-position clutch indicates the input and output rotational speed ratio of the clutch which is being engaged at the time, and is 1.0.

As described above, in the normal power-on/upshift mode, the input and output rotational speed ratio $e_{CLO}$ of the previous-gear-position clutch increases from 1.0 and does not become smaller than 1.0. However, if the timing for the next-gear-position clutch to start engaging is delayed or the working oil pressure supplied to the next-gear-position clutch is too low, then the engine may race after the previous-gear-position clutch is disengaged. Should this happen, the input rotational speed of the previous-gear-position clutch is increased, and the input and output rotational speed ratio $e_{CLO}$ of the previous-gear-position clutch becomes smaller than 1.0 as shown in FIG. 4(B).

Engine racing can therefore accurately be determined by detecting whether the input and output rotational speed ratio $e_{CLO}$ of the previous-gear-position is smaller than 1.0 or not. In the control sequence shown in FIG. 3, a value slightly smaller than 1.0 is used as a threshold $e_{CLL}$ for comparison with the ratio $e_{CLO}$ in view of a detecting error, as described above. The step S7 therefore determines whether engine racing has occurred or not by detecting whether the input and output rotational speed ratio $e_{CLO}$ of the previous-gear-position clutch is smaller than the threshold $e_{CLL}$ or not.

If $e_{CLO} > = e_{CLL}$, then no engine racing takes place, and the timer is set to zero in a step S8, and control goes to a return step.

If $e_{CLO} < e_{CLL}$, then a step S9 determines whether such a condition has continued longer than a predetermined time $T_{UP}$. If yes, then a signal is issued to increase the operating pressure applied to the next-gear-position clutch to suppress the engine racing in a step S10. Then, the racing determining flag which indicates that the engine racing has been determined is turned on in a step S11.

If the gear shift is not an upshift in the step S4, then since a downshift is effected, control goes to a step S5 which determines whether the ratio $e_{CLa}$ of input and output rotational speeds (=(output speed)/(input speed)) of a next-gear-position clutch is smaller than the threshold $e_{CLL}$ which is slightly smaller than 1.0 in view of an error, the ratio $e_{CLO}$ being normally larger than 1.0 during a gear shift.

Figure 5B:
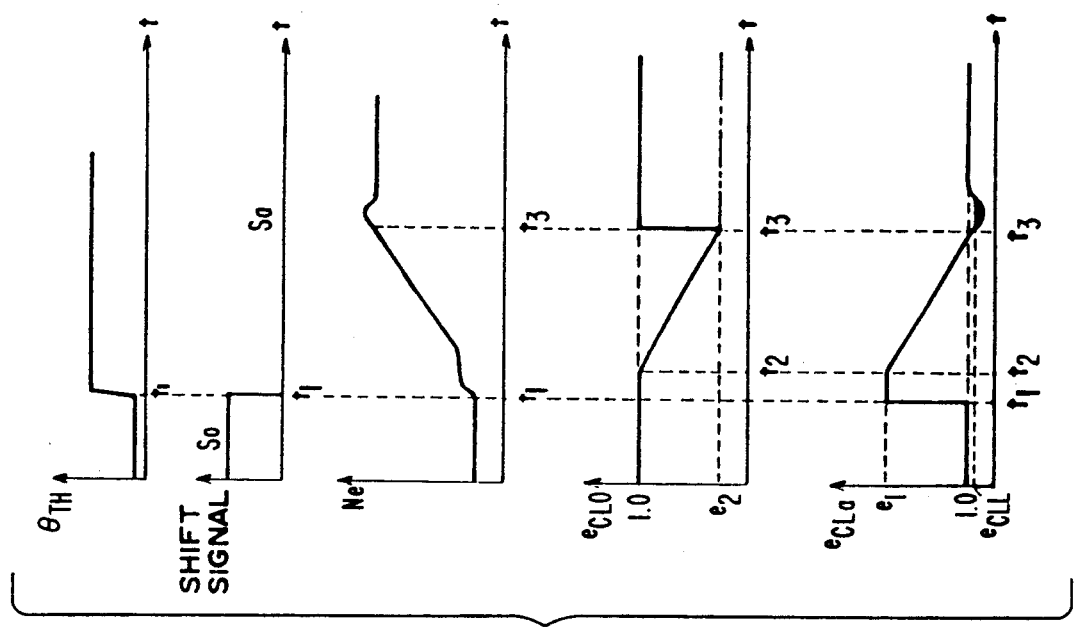
Figure 5A:
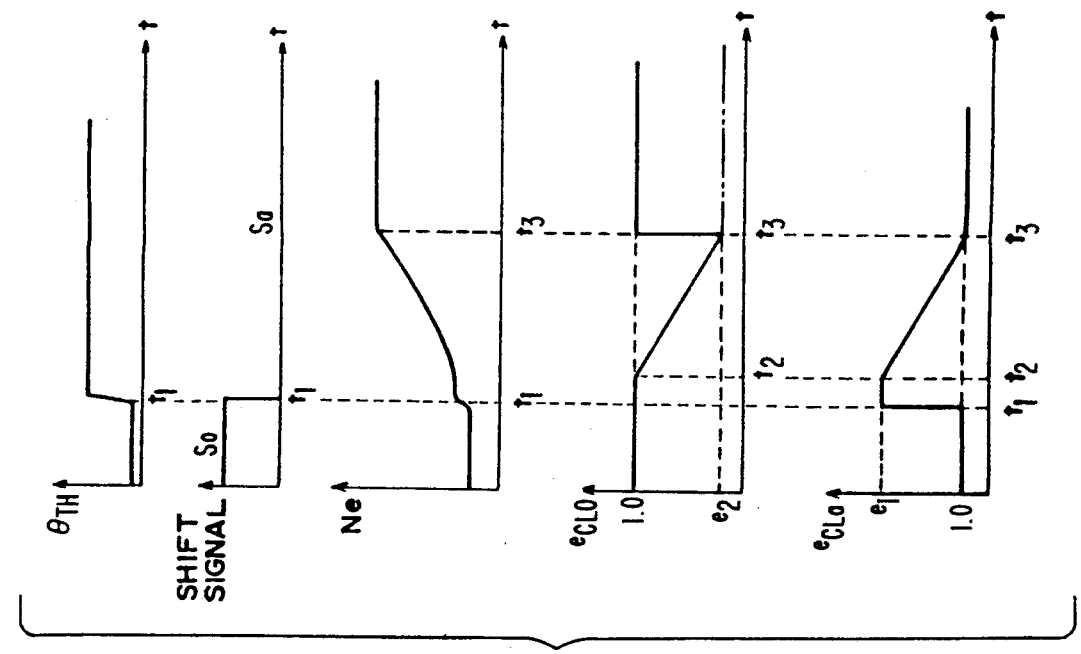

The decision step S5 will be described in more detail with reference to FIG. 5. FIG. 5 shows how throttle valve opening $\theta_{TH}$, shift signals, engine rotational speeds Ne, and the ratios $e_{CLO}$, $e_{CLa}$ of input and output rotational speeds of the previous-gear-position clutch and the next-gear-position clutch vary with respect to time. The graphs of FIG. 5 indicate the condition in which the accelerator pedal is abruptly depressed, and the running condition point moves across the downshifting line on the shift map at a time $t_1$ to issue a shift command by which a shift signal So is changed to a shift signal Sa. FIG. 5(A) shows the signals when there is no engine racing, and FIG. 5(B) shows the signals when engine racing occurs.

As illustrated in FIG. 5(A), the previous-gear-position clutch is disengaged after a predetermined time delay $t_2$ when the shift command is issued. At the time $t_2$, the input and output rotational speed ratio $e_{CLO}$ of the previous-gear-position clutch is 1.0. Thereafter, the input and output rotational speed ratio $e_{CLO}$ of the previous-gear-position clutch is progressively reduced as the engine rotational speed is increased. The input and output rotational speed ratio $e_{CLa}$ of the next-gear-position clutch is $e_1$ ($>1$) at the time $t_2$ and thereafter becomes progressively smaller and approaches 1.0 as the engine rotational speed is progressively increased. When the ratio $e_{CLa}$ reaches 1.0 (i.e., when both the input and output rotational speeds of the next-gear-position clutch become the same), the next-gear-position clutch is engaged to make a smooth downshift. The input and output rotational speed ratio $e_{CLa}$ of the next-gear-position clutch, therefore, does not fall below 1.0. Since the engine power output is increased by the depression of the accelerator pedal at the time $t_1$, the engine rotational speed is increased to an extent commensurate with a slippage in the torque converter. After the previous-gear-position clutch is disengaged, the engine rotational speed is increased to an extent corresponding to the amount of depression of the accelerator pedal.

As described above, in the normal power-on/downshift mode, the input and output rotational speed ratio $e_{CLa}$ of the next-gear-position clutch decreases from $e_1$ to 1.0 and does not become smaller than 1.0. However, if the timing for the next-gear-position clutch to start being engaged is delayed or the working oil pressure supplied to the next-gear-position clutch is too low, then the engine may race when the next-gear-position clutch is engaged. Should this happen, the input rotational speed of the next-gear-position clutch is increased, and the input and output rotational speed ratio $e_{CLa}$ of the next-gear-position clutch becomes smaller than 1.0 as shown in FIG. 5(B).

Engine racing can therefore accurately be determined by detecting whether the input and output rotational speed ratio $e_{CLa}$ of the next-gear-position is smaller than 1.0 or not. In the control sequence shown in FIG. 3, a value slightly smaller than 1.0 is used as a threshold $e_{CLL}$ for comparison with the ratio $e_{CLa}$ in view of a detecting error, as described above. The step S5 therefore determines whether engine racing has occurred or not by detecting if the input and output rotational speed ratio $e_{CLa}$ of the next-gear-position clutch is smaller than the threshold $e_{CLL}$ or not.

If $e_{CLa} > = e_{CLL}$, then no engine racing takes place, and the timer is set to zero in a step S6, and control goes to a return step.

If $e_{CLa} < e_{CLL}$, then the step S9 determines whether such a condition has continued longer than the predetermined time $T_{UP}$. If yes, then a signal is issued to increase the operating pressure applied to the next-gear-position clutch to suppress the engine racing in the step S10. Then, the racing determining flag which indicates that the engine racing has been determined is turned on in the step S11.

In the next gear shift, it is determined whether the racing determining flag is on or not in the step S3. Then, control goes to a step S12 in which the operating pressure to be applied to the next-gear-position clutch is increased so that no engine racing will occur. Therefore, any engine racing is prevented in advance from taking place in the next gear shift. The racing determining flag is reset in a step S13.

In the above method, when engine racing is detected, the operating pressure applied to the next-gear-position clutch is increased to prevent such engine racing. A method of preventing engine racing will be described in detail below.

As described above, in the power-on/upshift mode, if an upshift is smoothly made without engine racing after a command for such an upshift is generated, the input and output rotational speed ratio of the previous-gear-position clutch should not drop lower than 1.0. In the power-on/downshift mode, if a downshift is smoothly effected without engine racing, the input and output rotational speed ratio of the next-gear-position clutch should not drop below 1.0. Therefore, with the foregoing engine racing determining method, it is determined whether the input and output rotational speed ratio of the previous-gear-position clutch in the power-on/upshift mode, or the input output rotational speed ratio of the next-gear-position clutch in the power-on/downshift mode, is smaller than a predetermined threshold for a time longer than a predetermined period of time, the threshold being slightly smaller than 1.0 in view of a detecting error. Consequently, whether engine racing has taken place or not can simply and accurately be determined.

A method of determining engine racing in a gear shift in the power-on/downshift mode and preventing engine racing in a next gear shift will be described below with reference to the flowchart of FIG. 7.

A step S1 determines whether an engine racing calculating flag FKCALD is "1" or not. The engine racing calculating flag FKCALD is set to "1" when engine racing is detected and its magnitude is calculated in the power-on/downshift mode. If the engine racing calculating flag FKCALD is "0", i.e., if no engine racing occurs, control goes to a step S2 to determine whether a next gear position (target gear position) Sa is lower than the previous gear position (present gear position) So or not. The first through fourth gear positions are represented by 1 through 4, for example. The condition Sa>So indicates an upshift, the condition Sa<So indicates a downshift, and the condition Sa=So represents no gear shift but a normal running condition. If Sa>=So in the step S2, then the transmission is not effecting a gear shift or is effecting an upshift. In order to detect engine racing after the input and output rotational speed ratio of the target-gear-position clutch becomes 1.0 upon a downshift, the control sequence is ended only when a shift timer $T_{SH}=0$ in a step S3. If Sa<So in the step S2 and hence the transmission is effecting a downshift, the shift timer $T_{SH}$ is reset in a step S4, and its value becomes zero upon elapse of a time to which the timer is set. Control proceeds from the step S4 to a step S5 in which the present gear position So and the target gear position Sa are stored as a, b, respectively.

In the case where the engine racing calculating flag FKCALD=1, or in the case where the engine racing calculating flag FKCALD=0 but the shift timer $T_{SH}$ has not elapsed after a completion of a downshift, then control goes to a step S6 to determine whether the input and output rotational speed ratio $e_{CLa}$ of the next-gear-position clutch is smaller than 1.0 ($e_{CLa}<1.0$) or not. Since the input and output rotational speed ratio $e_{CLa}$ of the next-gear-position clutch is larger than 1.0 in the power-on/downshift unless there is engine racing, no engine racing is occurring if $e_{CLa}>=1.0$ and engine racing is occurring if $e_{CLa}<1.0$. In view of an error of detected input and output rotational speeds, a threshold slightly smaller than 1.0 (e.g., a threshold of 0.98) may be employed instead of 1.0.

If $e_{CLa}>=1.0$, i.e., if no engine racing is occurring, then a step S7 determines whether the engine racing calculating flag FKCALD=1 or not. If FKCALD=0, then the present control sequence is finished.

If $e_{CLa}<1.0$, i.e., if there is engine racing occurring, then the engine racing calculating flag FKCALD is set to "1" in a step S17. Thereafter, ($1.0-e_{CLa}$) is added to an integral BFKD (its initial value is zero) and the sum is used as a new integral BFKD in a step S18, after which the control sequence is ended. Since the control sequence of FIG. 7 is repeated at predetermined intervals, the calculation of the step S18 is effected insofar as engine racing continues, the area of a portion by which the speed ratio is smaller than 1.0, i.e., the integral BFKD of the input and output rotational speed ratio $e_{CLa}$ in the portion is calculated.

If there is no engine racing, since the input and output rotational speed ratio $e_{CLa}>=1.0$, control goes from the step S6 to the step S7. Since the engine racing calculating flag FKCALD=1, control proceeds to a step S8 in which the flag FKCALD is set to "0". The step S8 is followed by a step S9 which determines whether the integral BFKD is larger than a reference value FKJ or not. If BFKD<=FKJ, then it can be said that the magnitude of engine racing is in an allowable range and no correction is required. Thus, control goes to a step S16 in which the integral BFKD is set to zero, and the present control sequence is completed.

If BFDK>FKJ in the step S9, then it can be said that the magnitude of engine racing exceeds the allowable range, and control goes to a step S10 to determine whether a timing correction flag FETQM that is set when only clutch pressure correction is insufficient is 1 or not.

Figure 2:
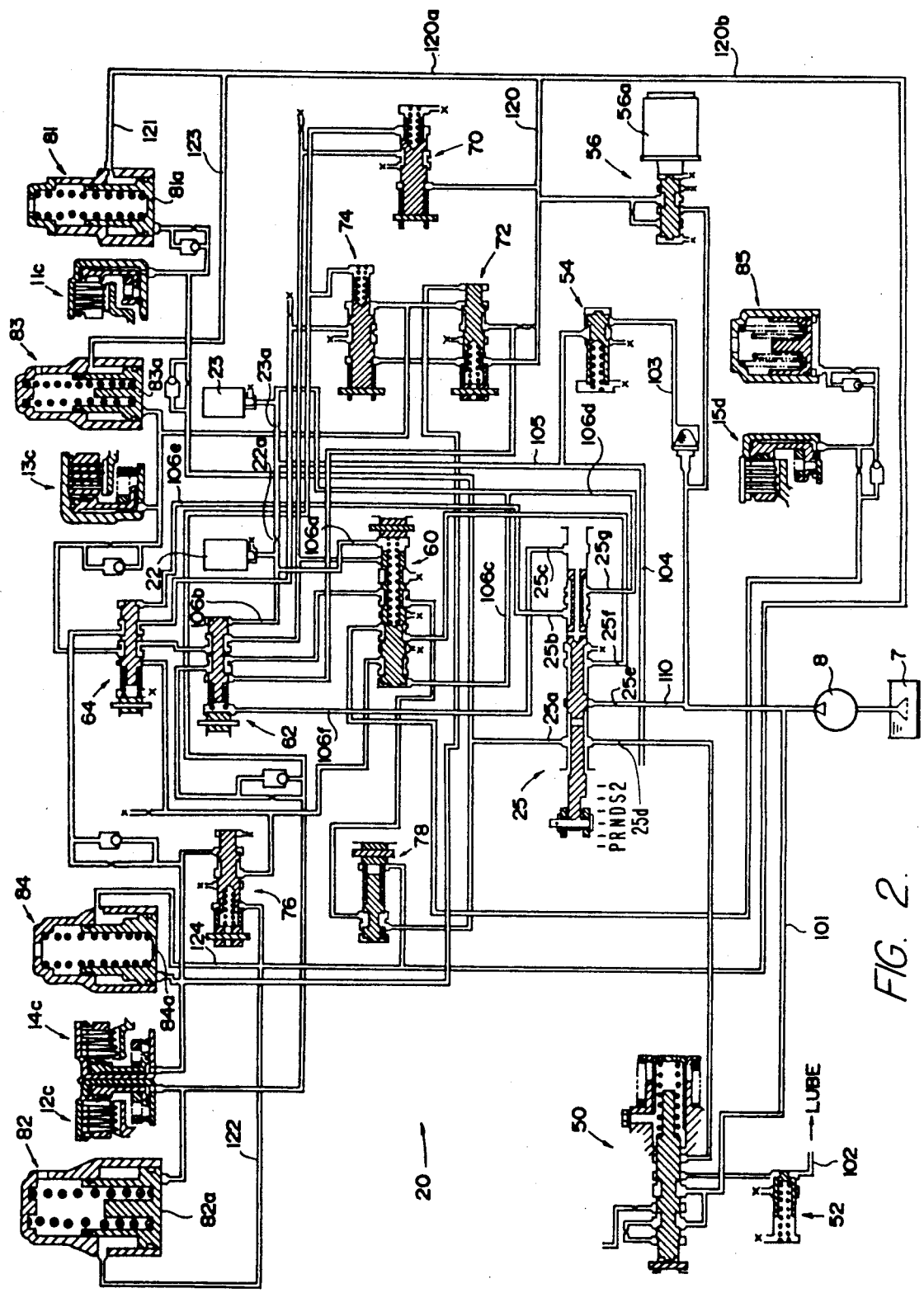
FIG. 2 is a circuit diagram of a hydraulic circuit including a hydraulic control valve assembly for use with the automatic transmission.

If FETQM=0, then a value (BFDK×$K_{PCL}$) produced by multiplying the integral BFDK by a predetermined coefficient $K_{PCL}$ is added to a control pressure (hydraulic pressure controlled by the linear solenoid valve 56 of FIG. 2) $P_{CL}(a,b)$ supplied to the next-gear-position clutch before a gear shift in the gear shift pattern (stored in the step S5) is completed, to correct the control pressure $P_{CL}(a,b)$ in step S12. Then, a step S13 determines whether the corrected hydraulic pressure $P_{CL}(a,b)$ is lower than a maximum control hydraulic pressure $P_{CL}max$ or not. If $P_{CL}(a,b)>P_{CL}max$, then since correction can effectively be carried out, control jumps to the step S16 in which the integral BFKD is set to zero, and the control sequence is ended.

If $P_{CL}(a,b)>P_{CL}max$, then since the hydraulic pressure cannot be raised beyond $P_{CL}max$, no correction can effectively be performed. Therefore, the control hydraulic pressure $P_{CL}(a,b)$ is set to the maximum hydraulic pressure $P_{CL}max$ in a step S14, and the timing correcting flag FETQM is set to 1 in a step S15.

If FETQM=1, and further if engine racing still occurs in a next gear shift, then control goes from the step S10 to a step S11 in which the product of the integral BFDK and predetermined coefficient $K_{CCP}$ is added to a reference rotational speed $e_{CCP}(a,b)$ for setting a time to start hydraulic pressure correction to correct the reference rotational speed $e_{CCP}(a,b)$, thus advancing the time to start hydraulic pressure correction.

A control operation for preventing engine racing according to the method shown in FIG. 7 will be described with reference to FIG. 8.

Figure 8:
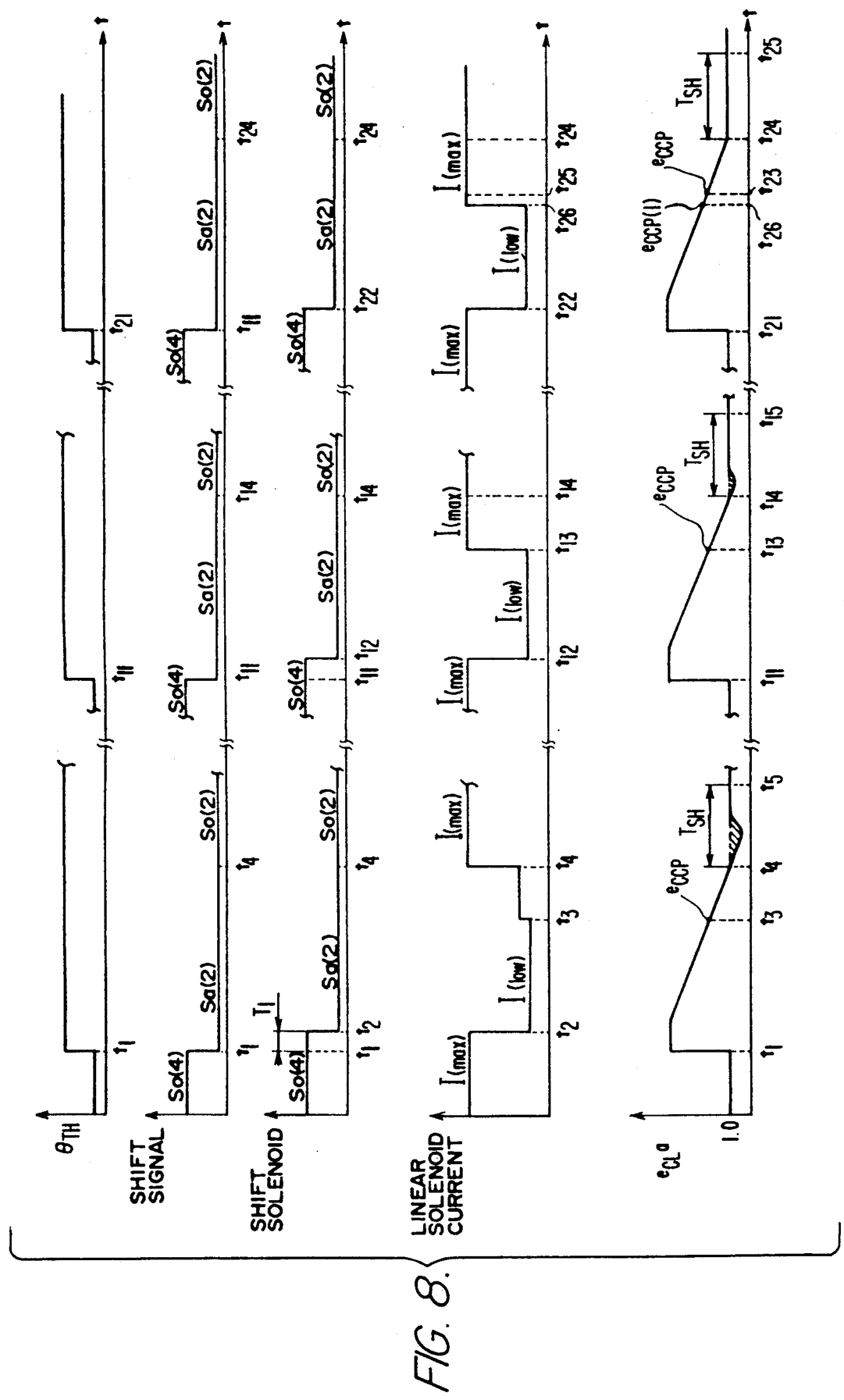
FIG. 8 is a set of graphs showing how throttle valve opening, a shift signal, a shift solenoid output signal, a linear solenoid current, and the ratio of input and output rotational speeds of a clutch vary with respect to time when the engine racing preventing method is effected.

FIG. 8 is a set of graphs showing how engine throttle valve openings $\theta_{TH}$, gear shift command signals, shift solenoid signals, linear solenoid currents, and the input and output rotational speed ratios $e_{CLa}$ of the next-gear-position clutch vary with respect to time. The left-hand graphs shown in FIG. 8(a) indicate how the above parameters vary when there is engine racing caused in the power-on/downshift. The central graphs shown in FIG. 8(b) indicate how the parameters vary when engine racing is caused even if the control hydraulic pressure is corrected to reach the maximum hydraulic pressure. The right-hand graphs shown in FIG. 8(c) indicate how the parameters vary when engine racing is prevented by subsequently effecting timing correction.

The left-hand graphs of FIG. 8(a) will first be described below. When the accelerator pedal is abruptly depressed while the vehicle is running, the throttle valve is opened rapidly. The running condition point moves across the downshifting curve Ld (see FIG. 6) at a time $t_1$, whereupon the gear shift command signal is changed from the present gear position (previous gear position) So (e.g., the fourth gear position) to the target gear position (next gear position) Sa (e.g., the second gear position).

If the accelerator pedal is further depressed or released immediately after the gear shift command signal is issued, a next gear shift command signal is issued in a short time to successively effect a next gear shift. To prevent such successive gear shifts in a short period of time (i.e., to prevent busy gear shifting), the shift solenoid signal is changed from the previous gear position So to the next gear position Sa at a time $t_2$ with a predetermined time delay $T_1$. The shift valve is now operated to switch the supply of hydraulic pressure to the hydraulically operated clutches to start a downshift from the fourth gear position to the second gear position.

At this time ($t_2$), the value of the electric current through the linear solenoid $56a$ is lowered from a maximum value I(max) to I(LOW). The current I(LOW) is selected such that the hydraulic pressure in the next-gear-position clutch is slightly lower than the hydraulic pressure capable of starting to engage the next-gear-position clutch, but is of such a magnitude as to move the operating piston of this clutch to a position just short of a clutch engaging position to eliminate any ineffective stroke of the clutch.

Thereafter, when the input and output rotational speed ratio $e_{CLa}$ of the next-gear-position clutch becomes 1.0, the above current may be increased to the maximum value I(max) to completely engage the next-gear-position clutch. In such a control mode, however, the input and output rotational speed ratio $e_{CLa}$ often drops further from 1.0, thus allowing engine racing to occur. To prevent this, a reference rotational speed ratio $e_{CCP}$ higher than 1.0 is preset, and at a time $t_3$ when the input and output rotational speed ratio $e_{CLa}$ becomes smaller than the reference rotational speed ratio $e_{CCP}$, the current supplied to the linear solenoid is changed to a slightly higher value I(1). At a time $t_4$ when $e_{CLa}=1.0$, this current is increased to the maximum value I(max).

If the current value I(1) is not sufficiently high, the input and output rotational speed ratio $e_{CLa}$ of the next-gear-position clutch may become lower than 1.0 from the time $t_4$ at which $e_{CLa}=1.0$, causing engine racing.

At the time $t_4$ when the speed ratio $e_{CLa}=1.0$, it is determined that the gear shift is completed and the second gear position which has been the target gear position so far is now recognized as the present gear position. As such, the input and output rotational speed ratio $e_{CLa}$ of the next-gear-position clutch would not be detected after the time $t_4$. Instead, after the time $t_4$ when $e_{CLa}=0$, the shift timer $T_{SH}$ is operated, and the second gear position remains recognized as the target gear position (next gear position) to detect engine racing until a time $t_5$ when the present time $T_{SH}$ of the shift timer elapses.

Figure 7:
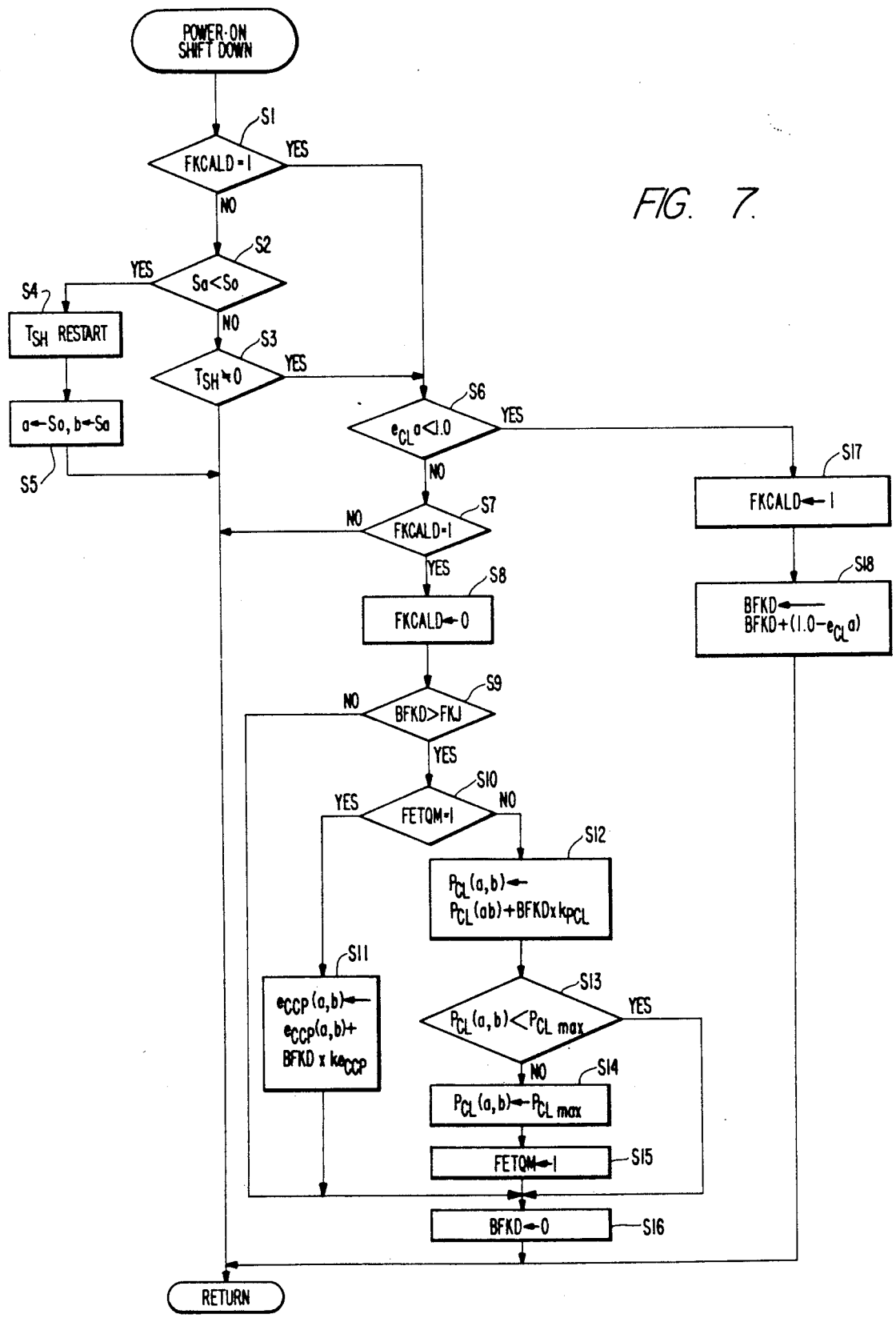
FIGS. 7, 9 and 10 are flowcharts illustrating an engine racing preventing method of the present invention.

When engine racing takes place at the time when the gear shift is completed and the input and output rotational speed ratio $e_{CLa}$ of the next-gear-position clutch becomes smaller than 1.0, the calculation in the step S18 shown in FIG. 7 is repeated to integrate the portion smaller than 1.0 to determine the area of the portion which is indicated as hatched in FIG. 8. The area represents the integral BFKD. As indicated by the calculation in the step S12, a corrected value of the control hydraulic pressure $P_{CL}(a,b)$ for the next-gear-position clutch is determined based on the integral BFKD, the current supplied to the linear solenoid $56a$ is corrected to develop the corrected control hydraulic pressure, and a corrected current I(2) is calculated.

Therefore, when the same power-on/downshift mode is effected again, the hydraulic pressure from the time when the input and output rotational speed ratio $e_{CLa}$ of the next-gear-position clutch becomes lower than the reference rotational speed ratio $e_{CCP}$ to the time when the speed ratio $e_{CLa}$ becomes 1.0 is increased by the above correcting process. Therefore, engine racing is suppressed. If such correction is not sufficient and engine racing is still sustained, the same hydraulic pressure correction as above is effected in the next gear shift. But the corrected hydraulic pressure $P_{CL}(a,b)$ cannot be set to a level higher than the maximum hydraulic pressure $P_{CL}$max.

The condition in which the corrected hydraulic pressure becomes $P_{CL}$max is shown in FIG. 8(b). The current supplied to the linear solenoid has the maximum value I(max) from a time $t_{13}$ when the input and output rotational speed ratio $e_{CLa}$ of the next-gear-position clutch becomes lower than the reference rotational speed $e_{CCP}$. Even if the hydraulic pressure is corrected in this manner, the input and output rotational speed ratio $e_{CLa}$ is lower than 1.0 and engine racing occurs in this case.

Therefore, when engine racing is detected, the timing correcting flag FETQM is set to "1", and the reference rotational speed $e_{CCP}$ is corrected as indicated by the step S11 of FIG. 7.

With the reference speed $e_{CCP}$ thus corrected, when a next gear shift is made, the time for increasing the current from I(LOW) to I(max) is determined based on a corrected reference rotational speed $e_{CCP}(1)$. The current is increased to the maximum value I(max) at a time ($t_{26}$) earlier than a time ($t_{23}$) based on the prior reference rotational speed $e_{CCP}$, as shown in FIG. 8(c). Therefore, the time to increase the hydraulic pressure in the next-gear-position clutch to the maximum hydraulic pressure $P_{CL}$max is advanced to prevent engine racing as shown. If one timing correction is insufficient, then the timing is further corrected. If engine racing can be corrected by correcting the hydraulic pressure, then no timing is corrected. Rather than correcting the timing first, the hydraulic pressure may be corrected. Alternatively, only the hydraulic pressure or the timing may be corrected.

In the above engine racing prevention method, the area (integral) of a portion in which the input and output rotational speed ratio $e_{CLa}$ of the next-gear-position clutch is smaller than 1.0 is calculated as the magnitude of engine racing. The hydraulic pressure supplied to the next-gear-position clutch and the timing thereof are corrected in subsequent gear shifts in the power-on/downshift mode based on the calculated integral for preventing engine racing. Another mode of calculating the magnitude of engine racing will be described below.

Figure 9:
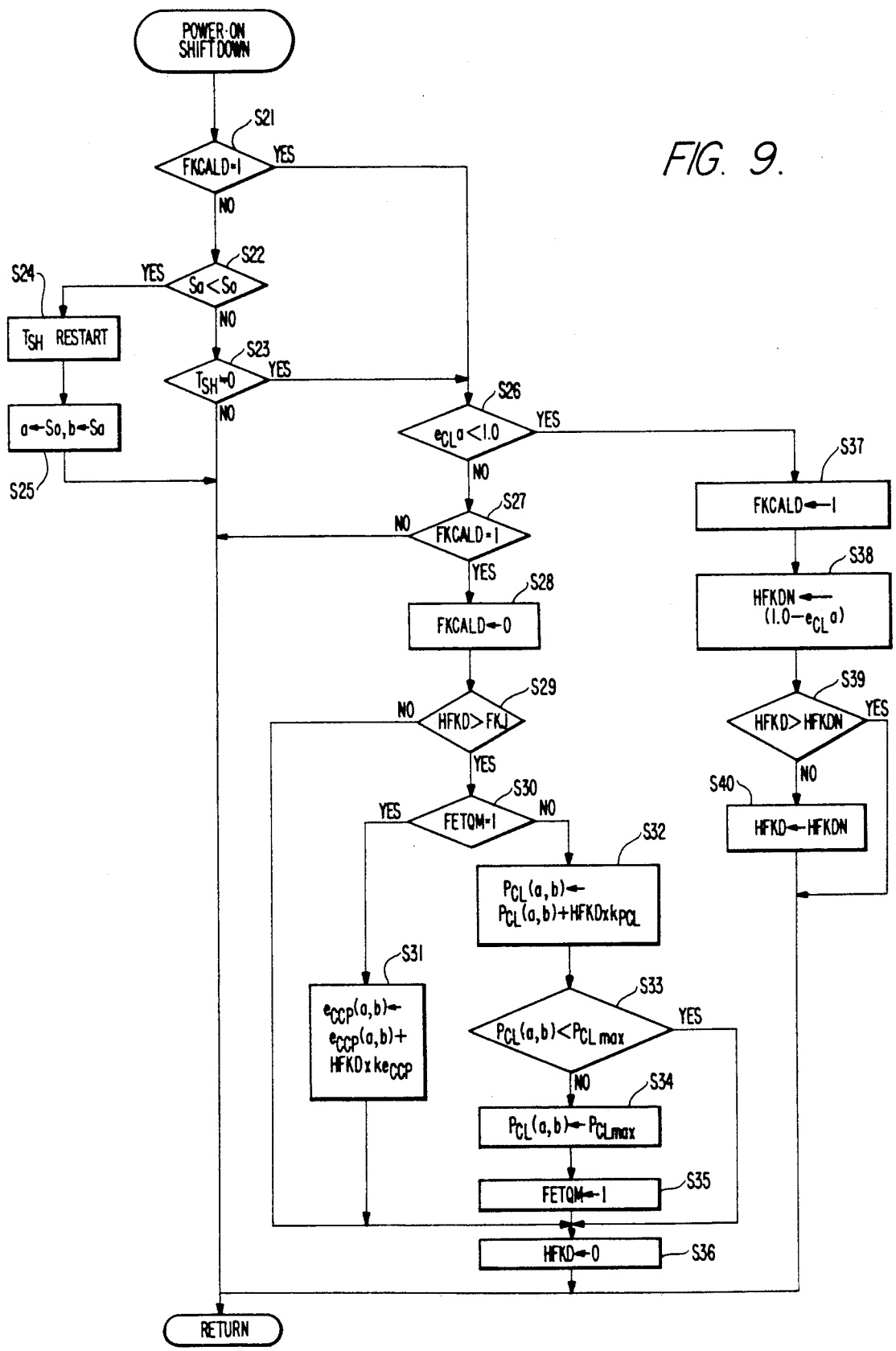

A mode of calculating the magnitude of engine racing based on the minimum value of the input and output rotational speed ratio $e_{CLa}$ of the next-gear-position clutch will be described with reference to the flowchart of FIG. 9. Steps S21 through S25 shown in FIG. 9 for determining whether the engine racing calculating flag FKCALD=1 or not and for executing other operations are the same as the steps S1 through S5 shown in FIG. 7.

In the case where the engine racing calculating flag FKCALD=1, or in the case where the engine racing calculating flag FKCALD=0 but the shift timer $T_{SH}$ has not elapsed, then control goes to a step S26 to determine whether the input and output rotational speed ratio $e_{CLa}$ of the next-gear-position clutch is smaller than 1.0 ($e_{CLa}<1.0$) or not.

If $e_{CLa}>=1.0$, i.e., if no engine racing is occurring, then a step S27 determines whether the engine racing calculating flag FKCALD=1 or not. If FKCALD=0, then the present control sequence is finished.

If $e_{CLa}<1.0$, i.e., if there is engine racing occurring, then the engine racing calculating flag FKCALD is set to "1" in a step S37. Thereafter, $(1.0 - e_{CLa})$, i.e., the amount HFKDN by which the input and output rotational speed ratio $e_{CLa}$ is lower than 1.0 is calculated in a step S38. Then, a step S39 determined determines whether the amount HFKDN is larger than a maximum value HFKD (its initial value is zero). If HFKD>HFKDN, then control goes to a step S40 in which the amount HFKDN is stored as the maximum value HFKD. While the input and output rotational speed ratio $e_{CLa}$ is lower than 1.0, the above control sequence is repeated at prescribed intervals to calculate the maximum value HFKD of the difference between the threshold 1.0 and the minimum value of $e_{CLa}$ (i.e., the maximum value by which $e_{CLa}$ is lower than 1.0).

If there is no engine racing, since the input and output rotational speed ratio $e_{CLa}> =1.0$, control goes from the step S26 to the step S27. Since the engine racing calculating flag FKCALD=1, control proceeds to a step S28 in which the flag FKCALD is set to "0". The step S28 is followed by a step S29 which determines whether the maximum value HFKD is larger than a reference value FKJ or not. If HFKD>FKJ, then the magnitude of engine racing exceeds an allowable range, and a step S30 determines whether a timing correcting flag EFTQM=1 or not. If EFTQM=0, the timing correction in a step S31 is effected in the same manner as shown in FIG. 7. The amount by which the timing is to be corrected is calculated based on a value produced by multiplying the maximum value HFKD calculated in the steps S38 through S40 by a predetermined coefficient $K_{PCL}$ or $K_{eCCP}$.

Where the hydraulic pressure supplied to the next-gear-position clutch and its timing are thus corrected for subsequent gear shifts in the power-on/downshift mode, engine racing is effectively prevented in the same manner as described with reference to FIG. 8.

Figure 10:
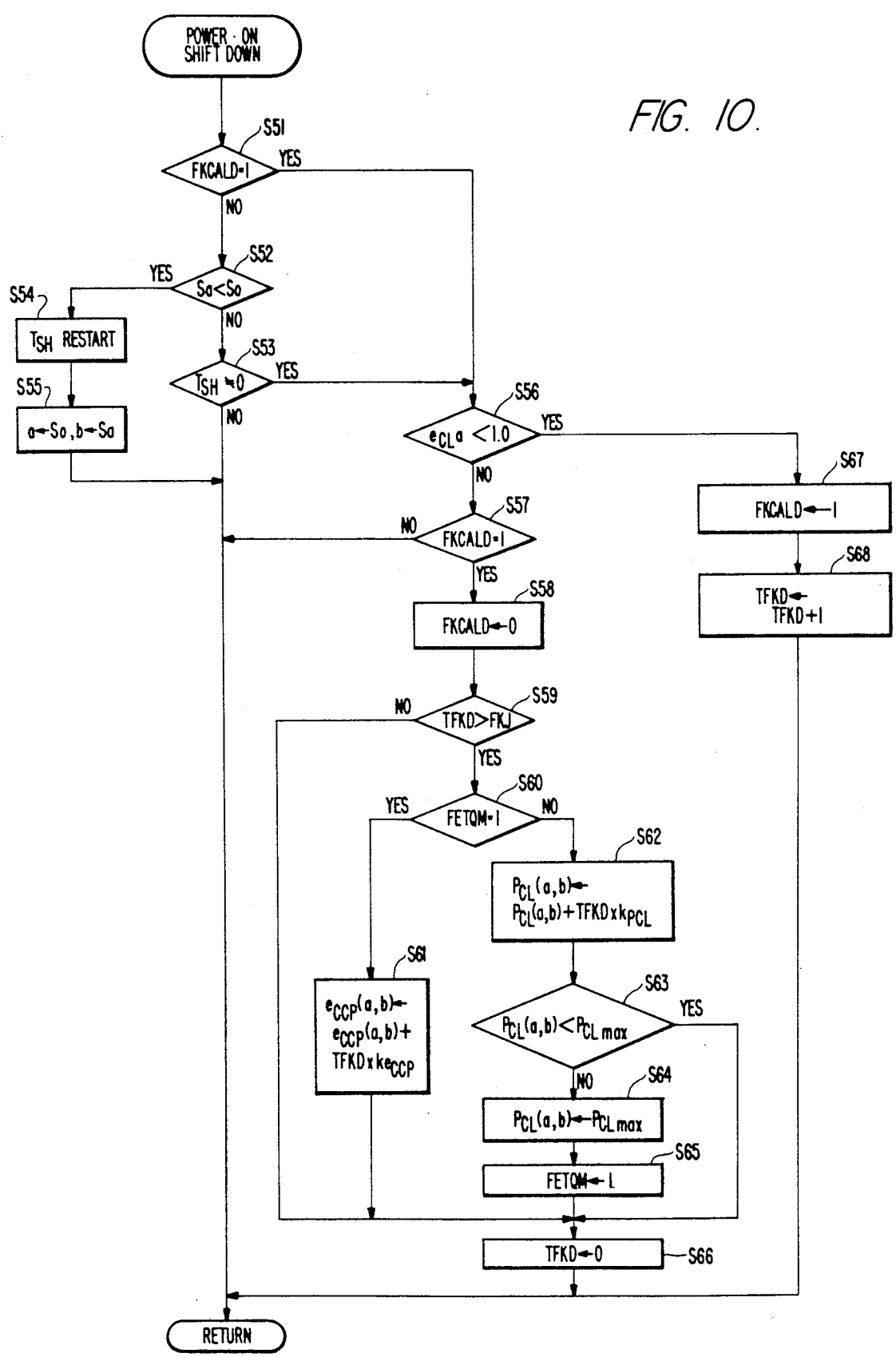

A control mode for preventing engine racing by calculating the magnitude of engine racing based on the length of a time during which the input and output rotational speed ratio $e_{CLa}$ of the next-gear-position clutch is lower than 1.0 will be described with reference to the flowchart of FIG. 10. The flowchart of FIG. 10 includes steps S51 through S56 which are the same as the steps S1 through S6 shown in FIG. 7.

If $e_{CLa}<1.0$ in the step S56, i.e., if there is engine racing occurring, then the engine racing calculating flag FKCALD is set to "1" in a step S67. Thereafter, "1" is added to the value TFKD of an engine racing timer (its initial value is zero), and the sum is stored as a new engine racing timer value TFKD in a Step S68. While the input and output rotational speed ratio $e_{CLa}$ is lower than 1.0, the above control sequence is repeated at prescribed intervals to calculate the length of a time during which the input and output rotational speed ratio $e_{CLa}$ is lower than the threshold 1.0.

If there is no engine racing, since the input and output rotational speed ratio $e_{CLa}> =1.0$, control goes from the step S56 to a step S57. Since the engine racing calculating flag FKCALD=1, control proceeds to a step S58 in which the flag FKCALD is set to "1". The step S58 is followed by a step S59 which determines whether the value TFKD of the engine racing timer is larger that a reference value FKJ or not. If TFKD>FKJ, then it can be said that the magnitude of engine racing exceeds an allowable range, and a step S60 determines whether a timing correcting flag FETQM=1 or not. If FETQM=0, then the hydraulic pressure correction indicated in steps S62 through S65 is effected. If FETQM=1, then the timing correction in a step S61 is effected in the same manner as shown in FIG. 7. The amount by which the timing is to be corrected is calculated based on a value produced by multiplying the maximum value TFKD calculated in the steps S67, S68 by a predetermined coefficient $K_{PCL}$ or $K_{eCCP}$.

Where the hydraulic pressure supplied to the next-gear-position clutch and its timing are thus corrected for next and subsequent gear shifts in the power-on/downshift mode, engine racing is effectively prevented in the same manner as described with reference to FIG. 8.

In the above method, engine racing in next and subsequent gear shifts is prevented by correcting the control hydraulic pressure supplied to the next-gear-position clutch based on the magnitude of the engine racing which has been caused. Alternatively, engine racing may be prevented from taking place by retarding the engine power output in the next and subsequent gear shifts.

As described above, when engine racing is caused in the power-on/downshift mode, engine racing in next and subsequent gear shifts can be prevented by correcting the control hydraulic pressure supplied to the next-gear-position clutch, the timing of starting to control the next-gear-position clutch, and the engine power output. Accordingly, gear shifts which give the driver a good feeling and which are free from gear shift shocks can be achieved.

Figure 11:
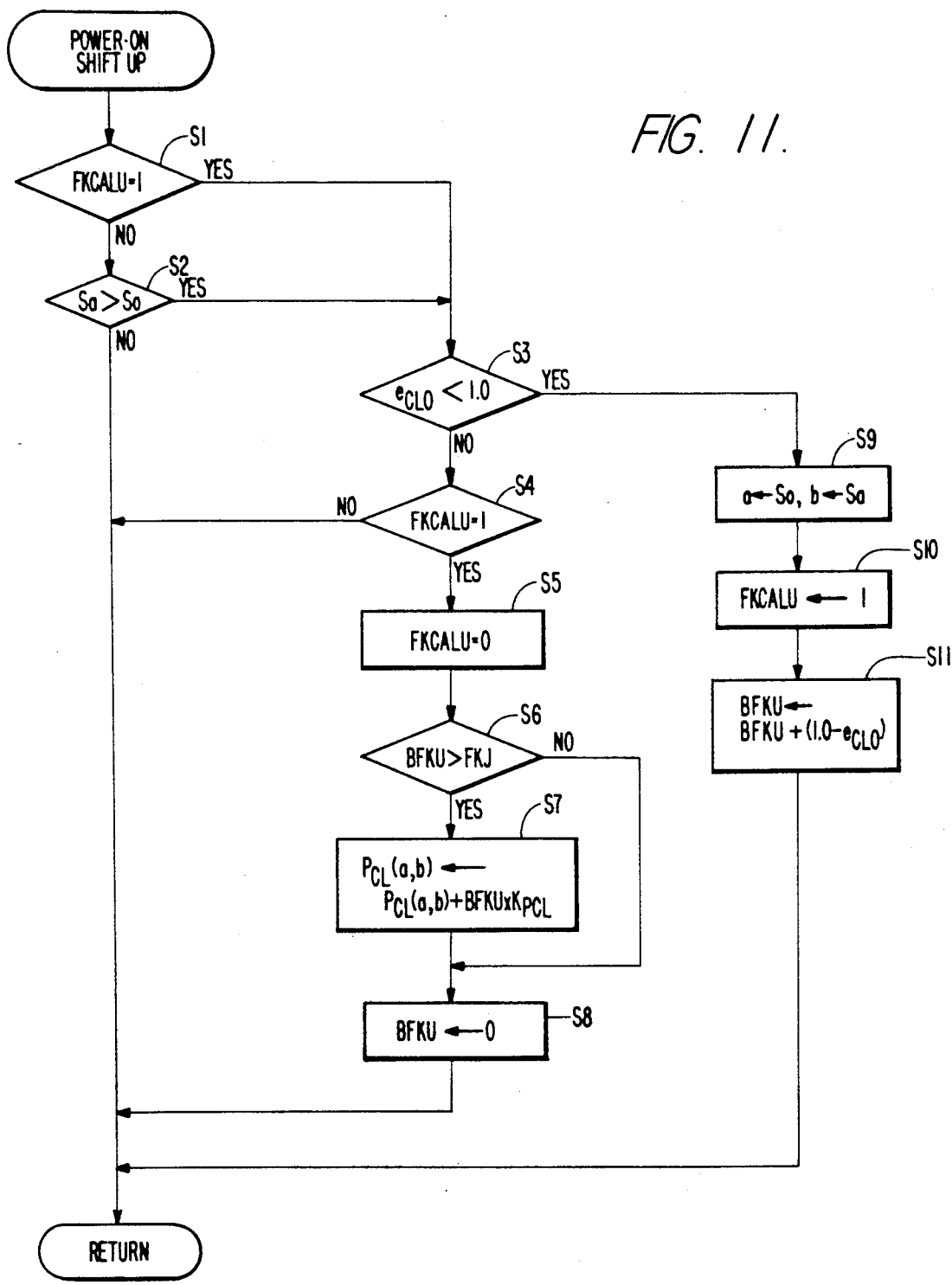
FIGS. 11, 13 and 14 are flowcharts showing an engine racing preventing method of the invention.

A method of determining engine racing and preventing engine racing in next and subsequent gear shifts when an upshift is effected in the power-on mode will be described below with reference to the flowchart of FIG. 11.

A step S1 determines whether an engine racing calculating flag FKCALD is "1" or not. The engine racing calculating flag FKCALD is set to "1" when engine racing is detected and its magnitude is calculated in the power-on/upshift mode. If the engine racing calculating flag FKCALD is "0", i.e., if no engine racing occurs, control goes to a step S2 to determine whether a next gear position (target gear position) Sa is larger than the previous gear position (present gear position) So or not. If Sa< =So in the step S2, then the transmission is not effecting a gear shift or is effecting a downshift. The control sequence moves to a return step.

In the case where the engine racing calculating flag FKCALU=1, or in the case where the engine racing calculating flag FKCALU=0 but the transmission is effecting an upshift (Sa>So), then control goes to a step S3 to determine whether the input and output rotational speed ratio $e_{CLO}$ of the previous-gear-position clutch is smaller than 1.0 ($e_{CLO}<1.0$) or not. Since the input and output rotational speed ratio $e_{CLO}$ of the previous-gear-position clutch is larger than 1.0 in the power-on/downshift unless there is engine racing, no engine racing is occurring if $e_{CLO}>1.0$ and engine racing is occurring if $e_{CLO}<1.0$. In view of an error of detected input and output rotational speeds, a threshold slightly smaller than 1.0 (e.g., a threshold of 0.98) may be employed.

If $e_{CLO}> =1.0$, i.e., if no engine racing is occurring, then a step S4 determines whether the engine racing calculating flag FKCALU=1 or not. IF FKCALU=0 then the present control sequence is finished.

If $e_{CLO}<1.0$, i.e., if there is engine racing occurring, then this gear shift pattern is stored in a step S9, and the engine racing calculating flag FKCALU is set to "1" in a step S10. Thereafter, $(1.0 - e_{CLO})$ is added to an integral BFKU (its initial value is zero) and the sum is used as a new integral BFKU in a step S11.

If there is no engine racing, since the input and output rotation speed ratio $e_{CLO} > = 1.0$, control goes from the step S3 to a step S4. Since the engine racing calculating flag FKCALU=1, control proceeds to a step S5 in which the flag FKCALU is set to "0". The step S5 is followed by a step S6 which determines whether the integral BFKU is larger than a reference value FKJ or not. IF BFKU>FKJ, then it can be said that the magnitude of engine racing is beyond an allowable range. Then, a value (BFKU×$K_{PCL}$) produced by multiplying the integral BFKU by a predetermined coefficient $K_{PCL}$ is added to a control pressure (hydraulic pressure controlled by the linear solenoid valve 56 of FIG. 2) $P_{CL}(a,b)$ supplied to the next-gear-position clutch in the gear shift pattern (stored in the step S9), to correct the control pressure $P_{CL}(a,b)$ in a step S7. Then, a step S8 resets the integral BFKU to zero, and the control sequence is finished. If BFKU<FKU, then no correction is required, and control skips the step S7 and goes to the step S8.

Prevention of engine racing according to the above method of FIG. 11 will be described with reference to FIG. 12. The left-hand graphs of FIG. 12 indicate how the various parameters vary with respect to time when engine racing is caused in the power-on/upshift mode, and the right-hand graphs show how the parameters vary with respect to time when the engine racing is prevented by correcting the hydraulic pressure supplied to the next-gear-position clutch dependent on the magnitude of the engine racing.

The left-hand graphs will first be described below. When the running condition point moves across the upshifting line $L_U$ (see FIG. 6) at a time $T_1$ while the vehicle is running with the accelerator pedal depressed to keep the throttle valve open to a certain degree, the gear shift command signal is changed from the present gear position (previous gear position) So (e.g., the third gear position) to the target gear position (next gear position) Sa (e.g., the fourth gear position).

If the accelerator pedal is further depressed or released immediately after the gear shift command signal is issued, a next gear shift command signal is issued in a short time to successively effect a next gear shift. To prevent such successive gear shifts in a short period of time (i.e., to prevent busy gear shifting), the shift solenoid signal is changed from the previous gear position So to the next gear position Sa at a time $T_2$ with a predetermined time $T_{1U}$. The shift valve is now operated to switch the supply of hydraulic pressure to the hydraulically operated clutches to start an upshift from the third gear position to the fourth gear position.

At this time ($t_2$), the value of the electric current through the linear solenoid 56a is lowered from maximum value I(max) to $I_{LOW}(1)$. The current is lowered since if the hydraulic pressure supplied to the next-gear-position clutch were excessively high, this clutch would abruptly be engaged producing a shift shock. By reducing the current supplied to the linear solenoid 56a, the next-gear-position clutch is gradually engaged to effect a smooth gear shift.

If the value of the current $I_{LOW}(1)$ were too low, since the previous-gear-position clutch has already been disengaged and the engine rotational speed is on the increase in the power-on mode, the next-gear-position clutch might not be engaged sufficiently, and hence the engine would race temporarily. For example, in FIG. 12, when the shift solenoid is energized at the time $t_2$, after a slight time delay, the engine races in a time interval from a time $t_3$ to a time $t_4$, and the input and output rotational speed ratio $e_{CLO}$ of the previous-gear-position clutch becomes smaller than 1.0. The engine rotational speed is sharply increased during such an interval.

Thereafter, as the next-gear-position clutch is progressively engaged, the input and output rotational speed ratio $e_{CLO}$ of the previous-gear-position clutch is progressively increased, and then becomes $e_1$ when the next-gear-position clutch is fully engaged. When the next-gear-position clutch is fully engaged, the value of the current supplied to the linear solenoid 56a is I(max). The gear position with its associated clutch fully engaged is now the present gear position, and no target gear position exists (as actual information, the value of the present gear position is read). Therefore, $e_{CLO}$ becomes 1.0 at this time.

When the engine races and the input and output rotational speed ratio $e_{CLO}$ of the previous-gear-position clutch becomes lower than 1.0 in the power-on/upshift mode, the calculation in the step S11 is repeated to integrate the portion below 1.0 to determine the area indicated as hatched in FIG. 12. The area thus determined represents the integral BFKU. Based on the integral BFKU, a corrected value of the control hydraulic pressure $P_{CL}(a,b)$ for the next-gear-position clutch in a gear shift is determined. The current supplied to the linear solenoid 56a in order to produce the corrected control hydraulic pressure is corrected, and the corrected current $I_{LOW}(2)$ is calculated.

Figure 12:
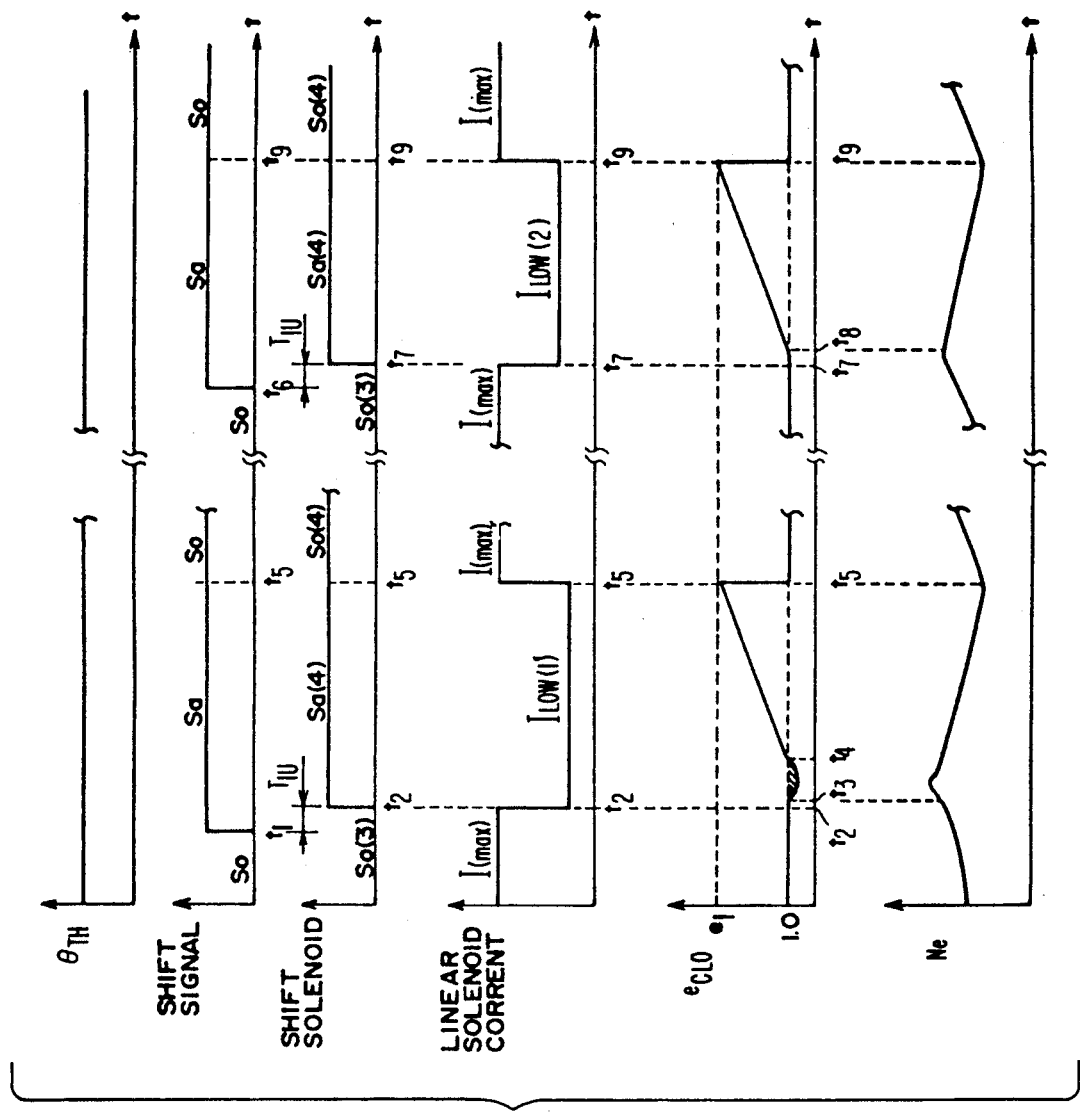
FIG. 12 is a set of graphs showing how a throttle valve opening, a shift signal, a shift solenoid output signal, a linear solenoid current, and the ratio of input and output rotational speeds of a clutch vary with respect to time when the latter engine racing preventing method is effected.

If the same power-on/upshift mode as above is carried out next, then the parameters are varied as shown in the right-hand graphs FIG. 12. At the time the running condition point moves across the upshifting line $L_U$, a gear shift command is issued, and after a predetermined time delay $T_{1U}$, a gear shift signal is applied to the shift solenoid, and at the same time the current supplied to the linear solenoid 56 is lowered from I(-max) to $I_{LOW}(2)$. The lowered current $I_{LOW}(2)$ as it is corrected is higher than the previous current $I_{LOW}(1)$, and the hydraulic pressure applied to operate the next-gear-position clutch is higher than that of the previous shift. Therefore, the engaging force of the next-gear-position clutch is higher than the previous engaging force thereof, thereby suppressing engine racing.

In the above illustrated method, engine racing is prevented by one correction process. If the amount of correction were too large, the engaging force of the next-gear-position clutch would be too strong and a gear shift shock might be produced. Therefore, the amount of correction should not be too large, and engine racing may progressively be suppressed by effecting several correction processes.

In the above engine racing prevention method, the area (integral) of a portion by which the input and output rotational speed ratio $e_{CLO}$ of the previous-gear-position clutch is smaller than 1.0 is calculated as the magnitude of engine racing, and the control hydraulic pressure supplied to the next-gear-position clutch is corrected in next and subsequent gear shifts in the power-on/upshift mode based on the calculated integral for preventing engine racing. Another mode of calculating the magnitude of engine racing will be described below.

Figure 13:
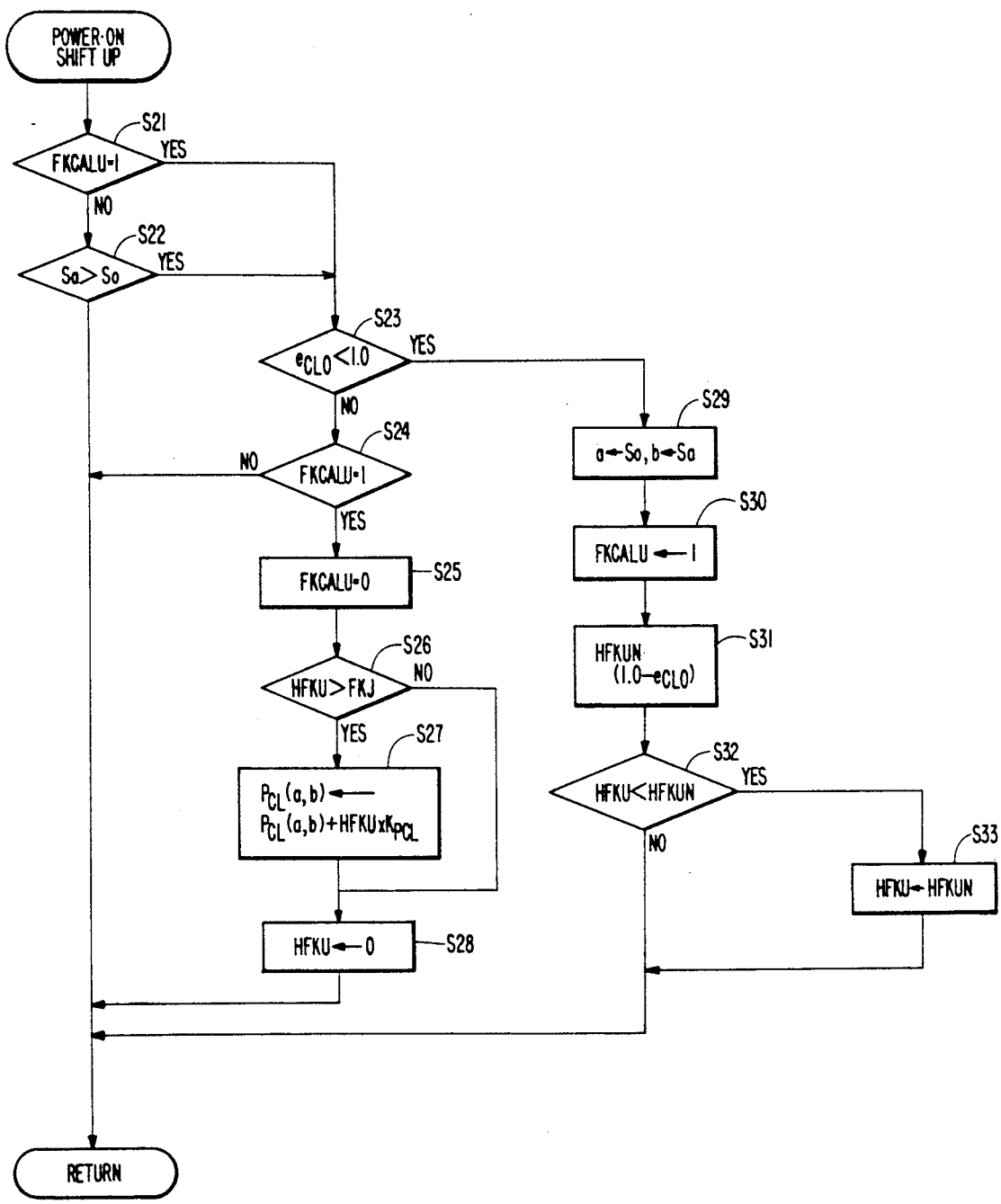

A mode of calculating the magnitude of engine racing from the minimum value of the input and output rotational speed ratio $e_{CLO}$ of the previous-gear-position clutch will be described with reference to the flowchart of FIG. 13. First, a step S21 determines whether an engine racing calculating flag FKCALU=1 or not. If FKCALU=0, then control goes to a step S22 to determine whether Sa>So. If Sa<=So, then the control sequence is ended.

If the engine racing calculating flag FKCALU=1, or if the engine racing calculating flag FKCALU=0 but the transmission is effecting an upshift (Sa>So), then control goes to a step S23 to determine whether the input and output rotational speed ratio $e_{CLO}$ of the previous-gear-position clutch is smaller than 1.0 ($e_{CLO}<1.00$) or not.

If $e_{CLO}>=1.0$, i.e., if no engine racing is occurring, then a step S24 determines whether the engine racing calculating flag FKCALU=1 or not. If FKCALU=0, then the control sequence is finished.

If $e_{CLO}<1.0$, i.e., if there is engine racing occurring, then this gear shift pattern is stored in a step S29, and the engine racing calculating flag FKCALU is set to "1" in a step S30. Thereafter, $(1.0-e_{CLO})$, i.e., the amount HFKUN by which the input and output rotational speed ratio $e_{CLO}$ is lower than 1.0 is calculated in a step S31. Then, a step S32 determines whether the amount HFKUN is larger than a maximum value HFKU (its initial value is zero). If HFKU>HFKUN, then control goes to a step S33 in which the amount HFKUN is stored as the maximum value HFKU. While the input and output rotational speed ratio $e_{CLO}$ is lower than 1.0, the above control sequence is repeated at prescribed intervals to calculate the maximum value HFKU of the difference between the threshold 1.0 and the minimum value of $e_{CLO}$ (i.e., the maximum value by which $e_{CLO}$ is lower than 1.0).

If there is no engine racing, since the input and output rotational speed ratio $e_{CLO}>=1.0$, control goes from the step S23 to a step S24. Since the engine racing calculating flag FKCALU=1, control proceeds to a step S25 in which the flag FKCALU is set to "0". The step S25 is followed by a step S26 which determines whether the maximum value HFKU is larger than a reference value FKJ or not. If HFKU>FKJ, then the magnitude of engine racing exceeds an allowable range, and a value (HFKU×$K_{PCL}$) produced by multiplying the maximum value HFKU by a predetermined coefficient $K_{PCL}$ is added to a control pressure $P_{CL}(a,b)$ supplied to a next-gear-position clutch in the gear shift pattern (stored in the step S29), to correct the control pressure $P_{CL}(a,b)$ in a step S27. Then a step S28 resets the integral HFKU to zero, and the control sequence is finished.

By employing the thus corrected control hydraulic pressure as a control hydraulic pressure to be supplied to the next-gear-position clutch in next and subsequent gear shift in the power-on/upshift mode, engine racing can effectively be prevented from occurring in the same manner as described with reference to FIG. 12.

Figure 14:
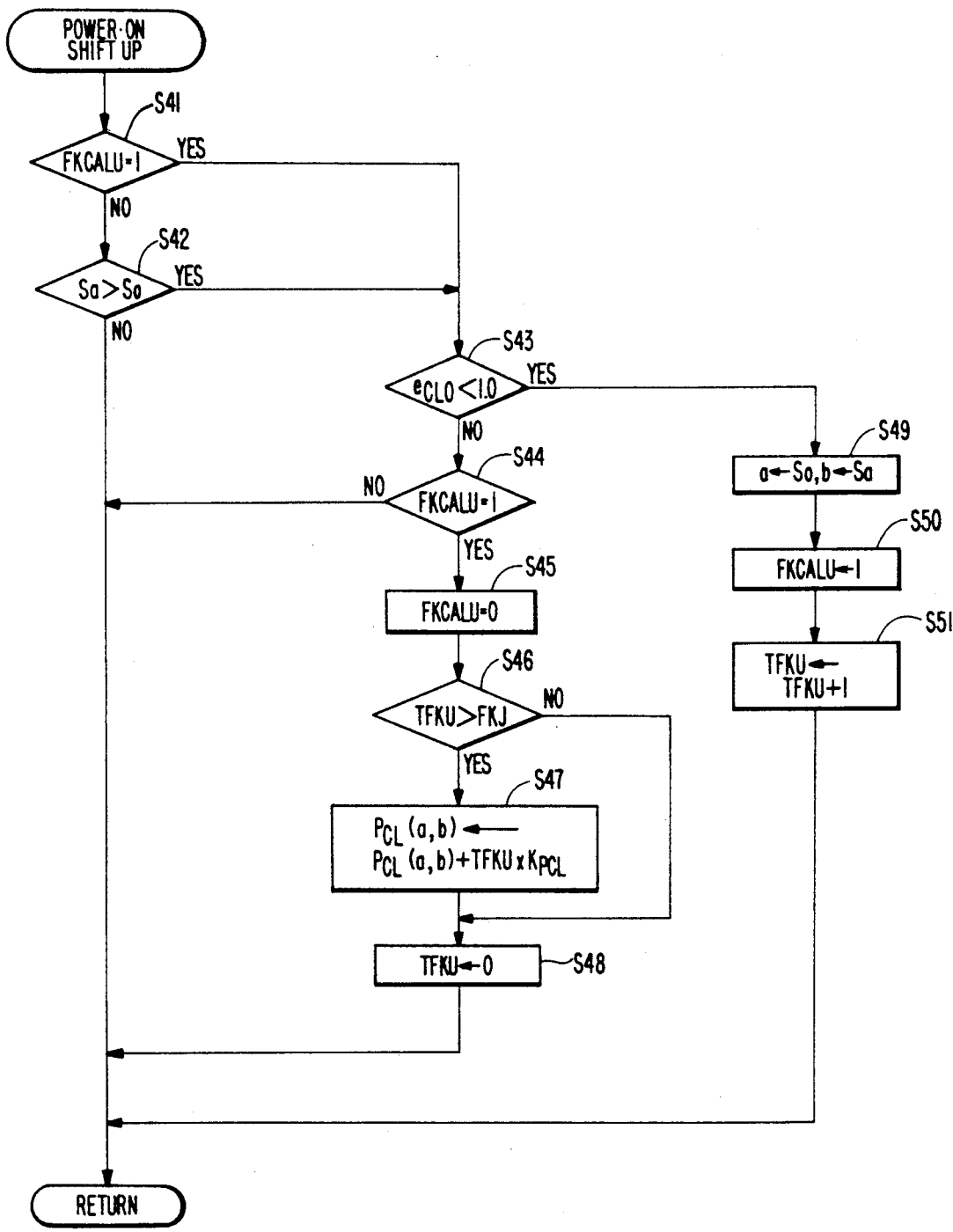

A control mode for preventing engine racing by calculating the magnitude of engine racing based on the length of time during which the input and output rotational speed ratio $e_{CLO}$ of the previous-gear-position clutch is lower than 1.0 will be described with reference to the flowchart of FIG. 14.

First, a step S41 determines whether an engine racing calculating flag FKCALU=1 or not. If FKCALU=0, then control goes to a step S42 to determine whether Sa>So. If Sa>So, then the control sequence is ended.

If the engine racing calculating flag FKCALU=1, or if the engine racing calculating flag FKCALU=0 but the transmission is effecting an upshift (Sa>So), then control goes to a step S43 to determine whether the input and output rotational speed ratio $e_{CLO}$ of the previous-gear-position clutch is smaller than 1.0 ($e_{CLO}<1.0$) or not.

If $e_{CLO}<1.0$ i.e., if there is engine racing occurring, then this gear shift pattern is stored in a step S49, and the engine racing calculating flag FKCALU is set to "1" in a step S50. Thereafter, "1" is added to the value TFKU of an engine racing timer (its initial value is zero), and the sum is stored as a new engine racing timer value TFKU in a step S51. While the input and output rotational speed ratio $e_{CLO}$ is lower than 1.0, the above control sequence is repeated at prescribed intervals to calculate the length of time during which the input and output rotational speed ratio $e_{CLO}$ is lower than the threshold 1.0.

If there is no engine racing, since the input and output rotational speed ratio $e_{CLO}>=1.0$, control goes from the step S43 to a step S44. Since the engine racing calculating flag FKCALU=1, control proceeds to a step S45 in which the flag FKCALU is set to "0". The step S45 is followed by a step S46 which determines whether the value TFKU of the engine racing timer is larger than a reference value FKJ or not. If TFKU>FKJ, then the magnitude of engine racing exceeds an allowable range, and a value (TFKU×$K_{PCL}$) produced by multiplying the timer value TFKU by a predetermined coefficient $K_{PCL}$ is added to a control pressure $P_{CL}(a,b)$ supplied to the next-gear-position clutch in the gear shift pattern, to correct the control pressure $P_{CL}(a,b)$ in a step S47. Then, a step S48 resets the integral TFKU to zero, and the control sequence is finished.

By employing the corrected control hydraulic pressure in next and subsequent gear shifts in the power-on/upshift mode, engine racing can effectively be prevented from occurring in the same manner as described with reference to FIG. 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of determining engine racing during a gearshift in an automatic transmission having clutches associated with respective gear positions, said method comprising the steps of:

detecting an input-output rotational speed ratio in a previous-gear-position clutch, detecting an input-output rotational speed ratio in a next-gear-position clutch, determining which input-output rotational speed ratio either in said previous-gear-position clutch or said next-gear-position clutch is normally greater than 1.0 during a gearshift, and determining that engine racing has occurred when the input-output rotational speed ratio which is determined to be normally greater than 1.0 during said gearshift remains below a threshold value slightly smaller than 1.0 for a predetermined period of time.

2. A method according to claim 1, wherein said gearshift is a downshift in a power-on mode, and the input-output rotational speed ratio in the next-gear-position clutch is normally greater than 1.0 during said downshift.

3. A method according to claim 1, wherein said gearshift is an upshift in a power-on mode, and the input-output rotational speed ratio in the previous-gear-position clutch is normally greater than 1.0 during said upshift.

4. A method of determining and preventing engine racing during a downshift in a power-on mode in an automatic transmission having clutches associated with respective gear positions, said method comprising the steps of:
   detecting an input-output rotational speed ratio in a next-gear-position clutch;
   determining that engine racing has occurred when said input-output rotational speed ratio falls lower than a threshold which is slightly smaller than 1.0;
   calculating a magnitude of the engine racing;
   determining an amount of correction to prevent engine racing in subsequent power-on downshifts based on said magnitude; and
   correcting a control value of said next-gear-position clutch based on said determined amount of correction to prevent engine racing in the subsequent power-on downshifts.

5. A method according to claim 4, wherein said magnitude is an integral value calculated by integrating a value by which the input-output rotational speed ratio is lower than said threshold with respect to time.

6. A method according to claim 4, wherein said magnitude is a difference between a maximum value of said input-output rotational speed ratio and said threshold.

7. A method according to claim 4, wherein said magnitude is a period of time during which the input-output rotational speed ratio is lower than said threshold.

8. A method according to claim 4, wherein said control value is a hydraulic pressure applied on said next-gear-position clutch.

9. A method according to claim 4, wherein said control value is an electric current applied on a solenoid valve to control a hydraulic pressure for said next-gear-position clutch.

10. A method according to claim 4, wherein said control value is a time needed to increase a hydraulic pressure for said next-gear-position clutch.

11. A method according to claim 4, wherein said control value is an amount of retarding engine output power.

12. A method of determining and preventing engine racing during an upshift in a power-on mode in an automatic transmission having clutches associated with respective gear positions, said method comprising the steps of:
   detecting an input-output rotational speed ratio in a previous-gear-position clutch;
   determining that engine racing has occurred when said input-output rotational speed ratio falls lower than a threshold which is slightly smaller than 1.0;
   calculating a magnitude of the determined engine racing;
   determining an amount of correction to prevent engine racing in subsequent power-on upshisfts based on the magnitude; and
   correcting a control value of said previous-gear-position clutch based on said determined amount of correction to prevent engine racing in subsequent power-on upshifts.

13. A method according to claim 12, wherein said magnitude is an integral value calculated by integrating a value by which the input-output rotational speed ratio is lower than said threshold with respect to time.

14. A method according to claim 12, wherein said magnitude is a difference between a maximum value of said input-output rotational speed ratio and said threshold.

15. A method according to claim 12, wherein said magnitude is a period of time during which the input-output rotational speed ratio is lower than said threshold.

16. A method according to claim 12, wherein said control value is a hydraulic pressure applied on said previous-gear-position clutch.

17. A method according to claim 12, wherein said control value is an electric current applied on a solenoid valve to control a hydraulic pressure for said previous-gear-position clutch.

18. A method according to claim 12, wherein said control value is a time needed to increase a hydraulic pressure for said previous-gear-position clutch.

19. A method according to claim 12, wherein said control value is an amount of retarding engine output power.

* * * * *